United States Patent
Fitzgibbon et al.

(10) Patent No.: US 6,310,451 B1
(45) Date of Patent: *Oct. 30, 2001

(54) MOVABLE BARRIER OPERATOR HAVING FORCE AND POSITION LEARNING CAPABILITY

(75) Inventors: James J. Fitzgibbon, Streamwood; John V. Moravec, Willow Springs; Bradley Farris, Chicago, all of IL (US)

(73) Assignee: The Chamberlain Group, Inc., IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/587,207

(22) Filed: Jun. 5, 2000

Related U.S. Application Data

(63) Continuation of application No. 08/957,316, filed on Oct. 23, 1997, now Pat. No. 6,107,765, which is a continuation of application No. 08/703,015, filed on Aug. 26, 1996, now abandoned, which is a division of application No. 08/467,039, filed on Jun. 6, 1995, now abandoned.

(51) Int. Cl.[7] .................................................. H02K 7/10
(52) U.S. Cl. ..................... 318/266; 318/282; 318/286; 318/468; 318/470; 318/467; 318/603; 49/28
(58) Field of Search ..................... 318/264–266, 318/280–300, 455–479, 434, 600–603, 626; 49/26–28, 31, 25, 139

(56) References Cited

U.S. PATENT DOCUMENTS

| | | | |
|---|---|---|---|
| 4,394,607 | 7/1983 | Lemirande | 318/453 |
| 4,625,291 | 11/1986 | Hörman | 364/550 |
| 4,638,433 | 1/1987 | Schindler | 364/400 |
| 4,831,509 | 5/1989 | Jones et al. | 364/167.01 |
| 4,855,653 | 8/1989 | Lemirande | 318/282 |
| 4,888,531 | 12/1989 | Hörmann | 318/282 |
| 4,916,860 | 4/1990 | Richmond et al. | 49/28 |
| 5,040,331 | 8/1991 | Merendino et al. | 49/199 |
| 5,076,012 | 12/1991 | Richmond et al. | 49/28 |
| 5,230,179 | 7/1993 | Richmond et al. | 49/28 |
| 5,278,480 | 1/1994 | Murray | 318/626 |
| 5,282,337 | 2/1994 | Duhame et al. | 49/199 |
| 5,572,555 | 11/1996 | Soenen et al. | 375/364 |
| 5,619,191 | 4/1997 | Lambropoulos et al. | 340/825.69 |
| 5,847,665 | 12/1998 | Tu | 341/50 |
| 5,874,819 | 2/1999 | Hörmann | 318/468 |
| 5,933,090 | 8/1999 | Christenson | 340/825.69 |

*Primary Examiner*—David S. Martin
(74) *Attorney, Agent, or Firm*—Fitch, Even, Tabin & Flannery

(57) ABSTRACT

A movable barrier operator includes a wall control switch module having a learn switch thereon. The switch module is connectable to a control unit positioned in a head of a garage movable barrier operator. The head unit also contains an electric motor which is connected to a transmission for opening and closing a movable barrier such as a garage door. The switch module includes a plurality of switches coupled to capacitors which, when closed, have varying charge and discharge times to enable which switch has been closed. The control unit includes an automatic force incrementing system for adjusting the maximal opening and closing force to be placed upon the movable barrier during a learn operation. Likewise, end of travel limits pan also be set during a learn operation upon installation of the unit. The movable barrier operator also includes an ambient temperature sensor which is used to derive a motor temperature signal, which motor temperature signal is measured and is used to inhibit motor operation when further motor operation exceeds or is about to exceed set point temperature limits.

2 Claims, 25 Drawing Sheets

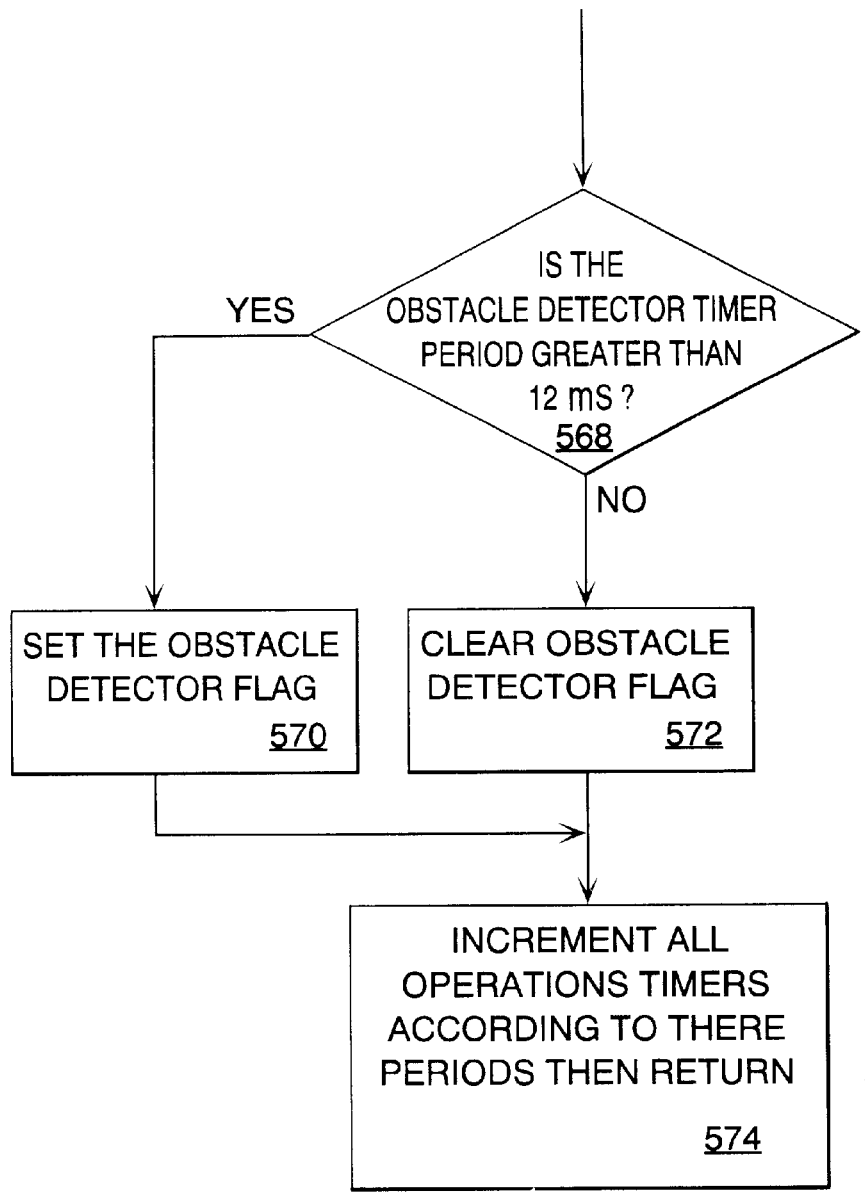
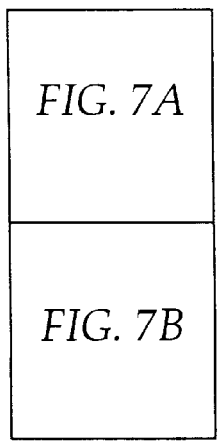
FIG. 7B

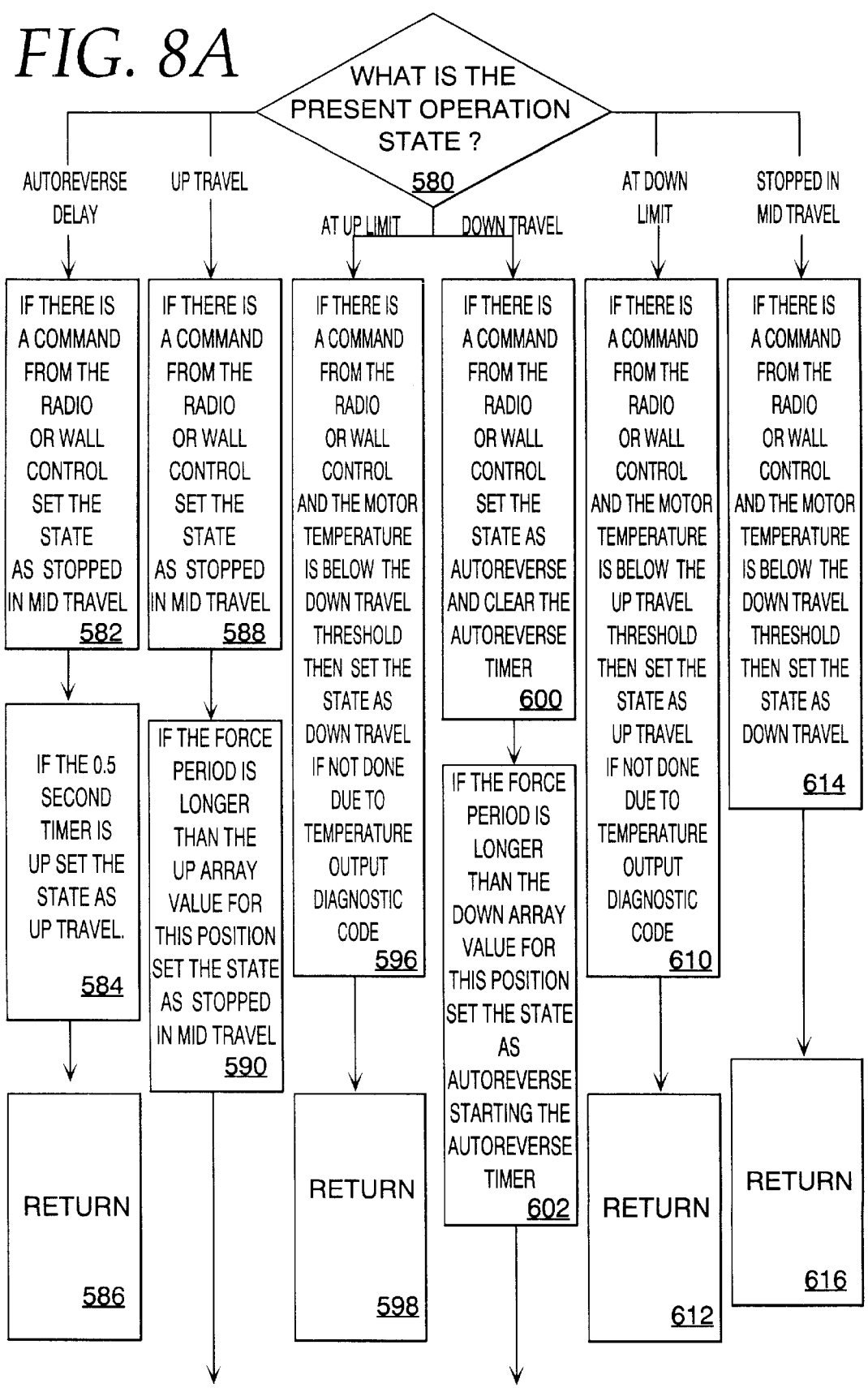

MOVABLE BARRIER OPERATOR HAVING FORCE AND POSITION LEARNING CAPABILITY

This is a continuation, of prior application number 08/957,316, filed Oct. 23, 1997 now U.S. Pat. No. 6,107,765, which is a continuation of application number 08/703,015, filed Aug. 26, 1996, now abandoned, which is a division of application number 08/467,039 filed Jun. 6, 1995 now abandoned, which is hereby incorporated herein by reference in its entirety. The entire disclosure of the prior application, from which a copy of the oath or declaration is supplied under paragraph 3 below, is considered as being part of the disclosure of the accompanying application, and is hereby incorporated by reference therein.

The computer program listing appendix contained within file "LAF56recreated.txt" on compact disc "1 of 1", which has been filed with the United States Patent and Trademark Office in duplicate, is hereby incorporated herein by reference. This file was created on Feb. 6, 2001, and is 151 KB in size.

BACKGROUND OF THE INVENTION

The invention relates in general to a movable barrier operator for opening and closing a movable barrier or door. More particularly, the invention relates to a garage door operator that can learn force and travel limits when installed and can simulate the temperature of its electric rotor to avoid motor failure during operation.

A number of garage door operators have been sold over the years. Most garage door operators include a head unit containing a motor having a transmission connected to it, which may be a chain drive or a screw drive, which is coupled to a garage door for opening and closing the garage door. Such garage door openers also have included optical detection systems located near the bottom of the travel of the door to prevent the door from closing on objects or on persons that may be in the path of the door. Such garage door operators typically include a wall control which is connected via one or more wires to the bead unit to send signals to the head unit to cause the head unit to open and close the garage door, to light a worklight or the like. Such prior art garage door operators also include a receiver and head unit for receiving radio frequency transmissions from a hand-held code transmitter or from a keypad transmitter which may be affixed to the outside of the garage or other structure. These garage door operators typically include adjustable limit switches which cause the garage door to operate or to halt the motor when the travel of the door causes the limit switch to change state which may either be in the up position or in the down position. This prevents damage to the door as well as damage to the structure supporting the door. It may be appreciated, however, that with different size garages and different size doors, the limits of travel rust be custom set once the unit is placed within the garage. In the past, such units have had mechanically adjustable limit switches which are typically set by an installer. The installer must go back and forth between the door, the wall switch and the head unit in order to make the adjustment. This, of course, is time consuming and results in the installer being forced to spend more time than is desirable to install the garage door operator.

A number of requirements are in existence from Underwriter's Laboratories, the Consumer Product Safety Commission and the like which require that garage door operators sold in the United States must, when in a closing mode and contacting an obstruction having a height of more than one inch, reverse and open the door in order to prevent damage to property and injury to persons. Prior art garage door operators also included systems whereby the force which the electric motor applied to the garage door through the transmission might be adjusted. Typically, this force is adjusted by a licensed repair technician or installer who obtained access to the inside of the head unit and adjusts a pair of potentiometers, one of which sets the maximal force to be applied during the closing portion of door operation, the other of which establishes the maximum force to be applied during the opening of door operation.

Such a garage door operator is exemplified by an operator taught in U.S. Pat. No. 4,638,443 to Schindler. However, such door operators are relatively inconvenient to install and invite misuse because the homeowner, using such a garage door operator, if the garage door operator begins to bind or jam in the tracks, may likely obtain access to the head unit and increase the force limit. Increasing the maximal force may allow the door to move passed a binding point, but apply the maximal force at the bottom of its travel when it is almost closed where, of course, it should not.

Another problem associated with prior art garage door operators is that they typically use electric motors having thermostats connected in series with portions of their windings. The thermostats are adapted to open when the temperature of the winding exceeds a preselected limit. The problem with such units is that when the thermostats open, the door then stops in whatever position it is then in and can neither be opened or closed until the motor cools, thereby preventing a person from exiting a garage or entering the garage if they need to.

SUMMARY OF THE INVENTION

The present invention is directed to a movable barrier operator which includes a head unit having an electric motor positioned therein, the motor being adapted to drive a transmission connectable to the motor, which transmission is connectable to a movable barrier such as a garage door. A wired switch is connectable to the head unit for commanding the head unit to open and close the door and for commanding a controller within the head unit to enter a learn mode. The controller includes a microcontroller having a non-volatile memory associated with it which can store force set points as well as digital end of travel positions within it. When the controller is placed in learn mode by appropriate switch closure from the wall switch, the door is caused to cycle open and closed. The force set point stored in the non-volatile memory is a relatively low set point and if the door is placed in learn mode and the door reaches a binding position, the set point will be changed by increasing the set point to enable the door to travel through the binding area. Thus, the set points will be dynamically adjusted as the door is in the learn mode, but the set points will not be changeable once the door is taken out of the learn mode, thereby preventing the force set point from being inadvertently increased, which might lead to property damage or injury.

Likewise, the end of travel positions can be adjusted automatically when in the learn mode because if the door is halted by the controller, when the controller senses that the door position has reached the previously set end of travel position, the door will then be commanded by a button push from the wall switch to keep travelling in the same direction, thereby incrementing or changing. The end of travel limits are set by pushing the learn button on the wall switch which causes the door to travel upward and continue travelling upward until the door has travelled as far as the installer wishes it to travel. The installer disables the learn switch by lifting his hand from the button. The up limit is then stored and the door is then moved toward the closed position. A pass point or position normalizing system consisting of a ring-like light interrupter attached to the garage door crosses the light path of an optical obstacle detector signaling instantaneously the position of the door and the door continues until it closes, whereupon force sensing in the door causes an auto-reverse to take place and then raises the door to the up position, the learn mode having been completed and the door travel limits having been set.

The movable barrier operator also includes a combination of a temperature sensor and microcontroller. The temperature sensor senses the ambient temperature within the head unit because it is positioned in proximity with the electric rotor. When the electric motor is operated, a count is incremented in the microcontroller which is multiplied by a constant which is indicative of the speed at which the motor is moving. This incremented multiplied count is then indicative of the rise in temperature which the motor has experienced by being operated. The count has subtracted from it the difference between the simulated temperature and the ambient temperature and the amount of time which the motor has been switched off. The totality of which is multiplied by a constant. The remaining count then is an indication of the extant temperature of the motor. In the event that the temperature, as determined by the microcontroller, is relatively high, the unit provides a predictive function in that if an attempt is made to open or close the garage door, prior to the door moving, the microcontroller will make a determination as to whether the single cycling of the door will add additional temperature to the motor causing it to exceed a set point temperature and, if so, will inhibit operation of the door to prevent the motor from being energized so as to exceed its safe temperature limit.

The movable barrier operator also includes light emitting diodes for providing an output indication to a user of when a problem may have been encountered with the door operator. In the event that further operation of the door operator will cause the motor to exceed its set point temperature, an LED will be illuminated as a result of the microcontroller temperature prediction indicating to the user that the motor is not operating because further operation will cause the motor to exceed its safe temperature limits.

It is a principal aspect of the present invention to provide a movable barrier operator which is able to quickly and automatically select end of travel positions.

It is another aspect of the present invention to provide a movable barrier operator which, upon installation, is able to quickly establish up and down force set points.

It is still another aspect of the present invention to provide a movable barrier operator which can determine the temperature of the motor based upon motor history and the ambient temperature of the head unit.

Other aspects and advantages of the invention will become obvious to one of ordinary skill in the art upon a perusal of the following specification and claims in light of the accompanying drawings.

BRIEF DESCRIPTION OF THE DRAWINGS

FIGS. 7A–B are flow diagrams of a timer routine executed by the microcontroller;

FIGS. 8A–B are flow diagrams of a state routine representative of the current and recent state of the electric motor;

DETAILED DESCRIPTION OF THE PREFERRED EMBODIMENT

Figure 1:
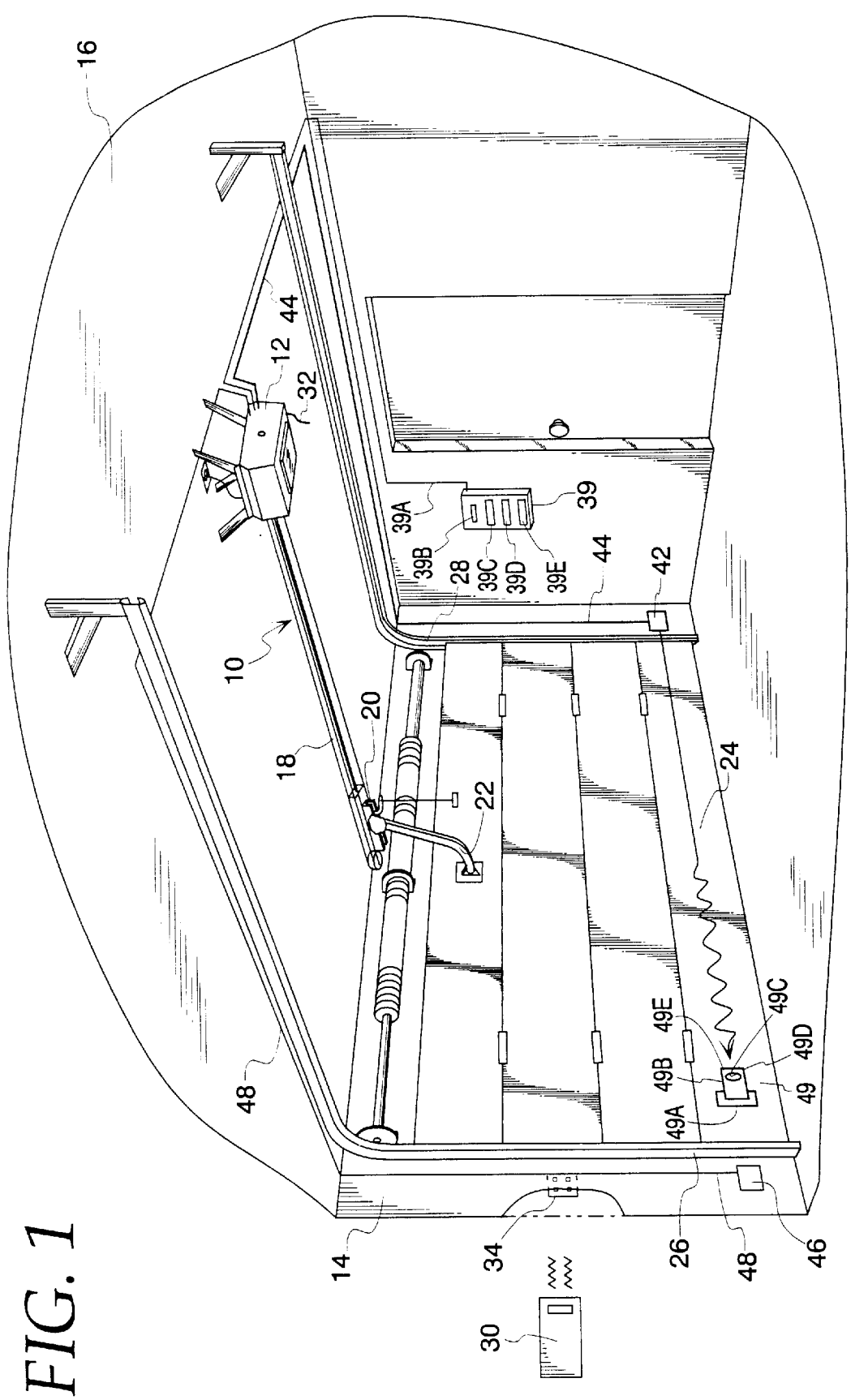
FIG. 1 is a perspective view of a garage having mounted within it a garage door operator embodying the present invention.

Referring now to the drawings and especially to FIG. 1, more specifically a movable barrier door operator or garage door operator is generally shown therein and referred to by numeral 10 includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to a receiver as will appear hereinafter. An external control pad 34 is positioned on the outside of the garage having a plurality of buttons thereon and communicates via radio frequency transmission with the antenna 32 of the head unit 12. A switch module 39 is mounted on a wall of the garage. The switch module 39 is connected to the head unit by a pair of wires 39*a*. he switch module 39 includes a learn switch 39*b*, a light switch 39*c*, a lock switch 39*d* and a command switch 39*e*. An optical emitter 42 is connected via a power and signal line 44 to the head unit 12. An optical detector 46 is via a wire 48 to the head unit 12. A pass point detector 49 comprising a bracket 49a and a plate structure 49b extending from the bracket has a substantially circular aperture 49c formed in the bracket, which aperture might also be square or rectangular. The pass point detector is arranged so that it interrupts the light beam on a bottom leg 49d and allows the light beam to pass through the aperture 49c. The light beam is again interrupted by the leg 49e, thereby signaling the controller via the optical detector 46 that the ass point detector attached to the door has moved past certain position allowing the controller to normalize or zero its position, as will be appreciated in more detail hereinafter.

Figure 2:
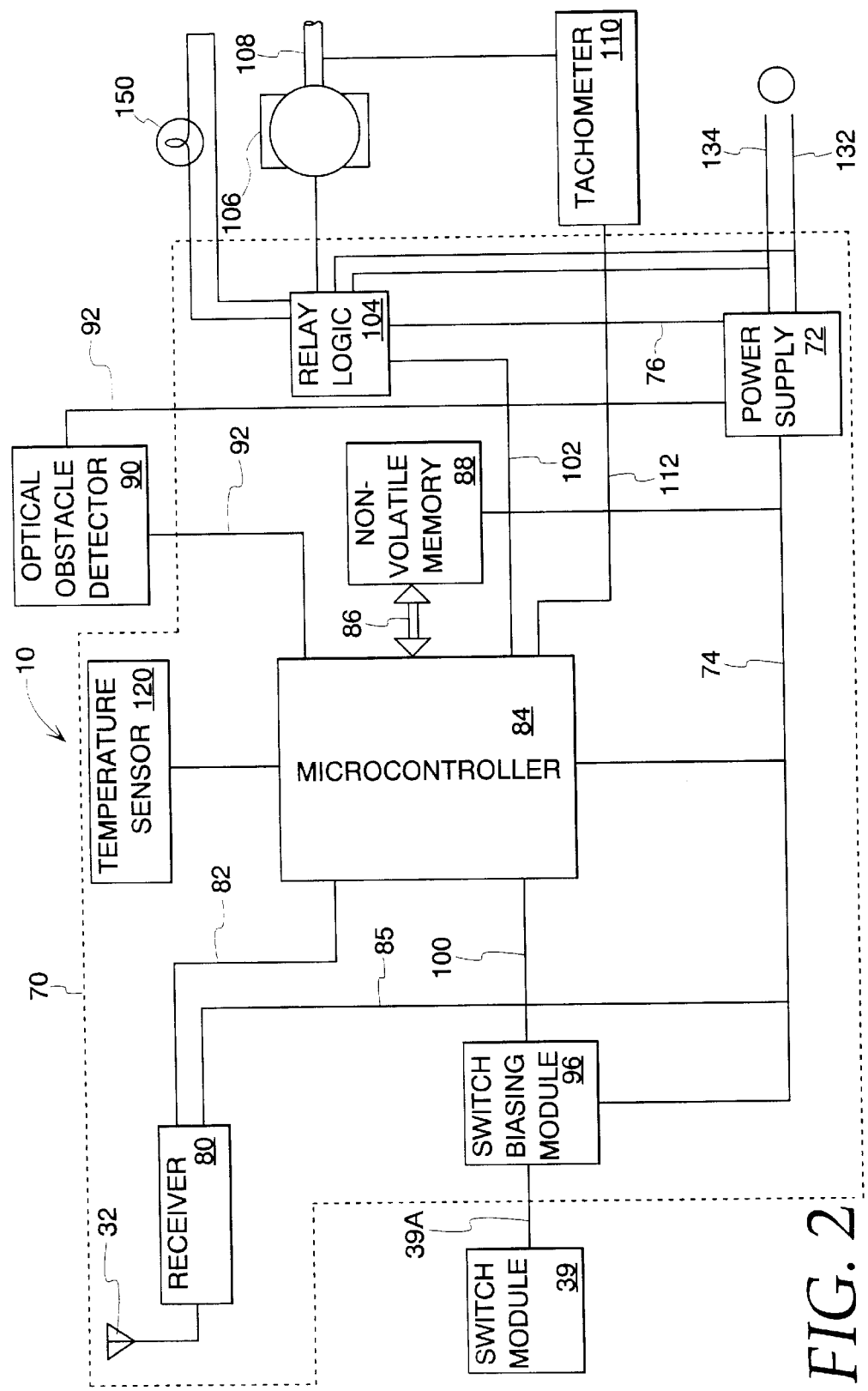
FIG. 2 is a block diagram of a controller mounted within the head unit of the garage door operator employed in the garage door operator shown in FIG. 1.
Figure 3A:
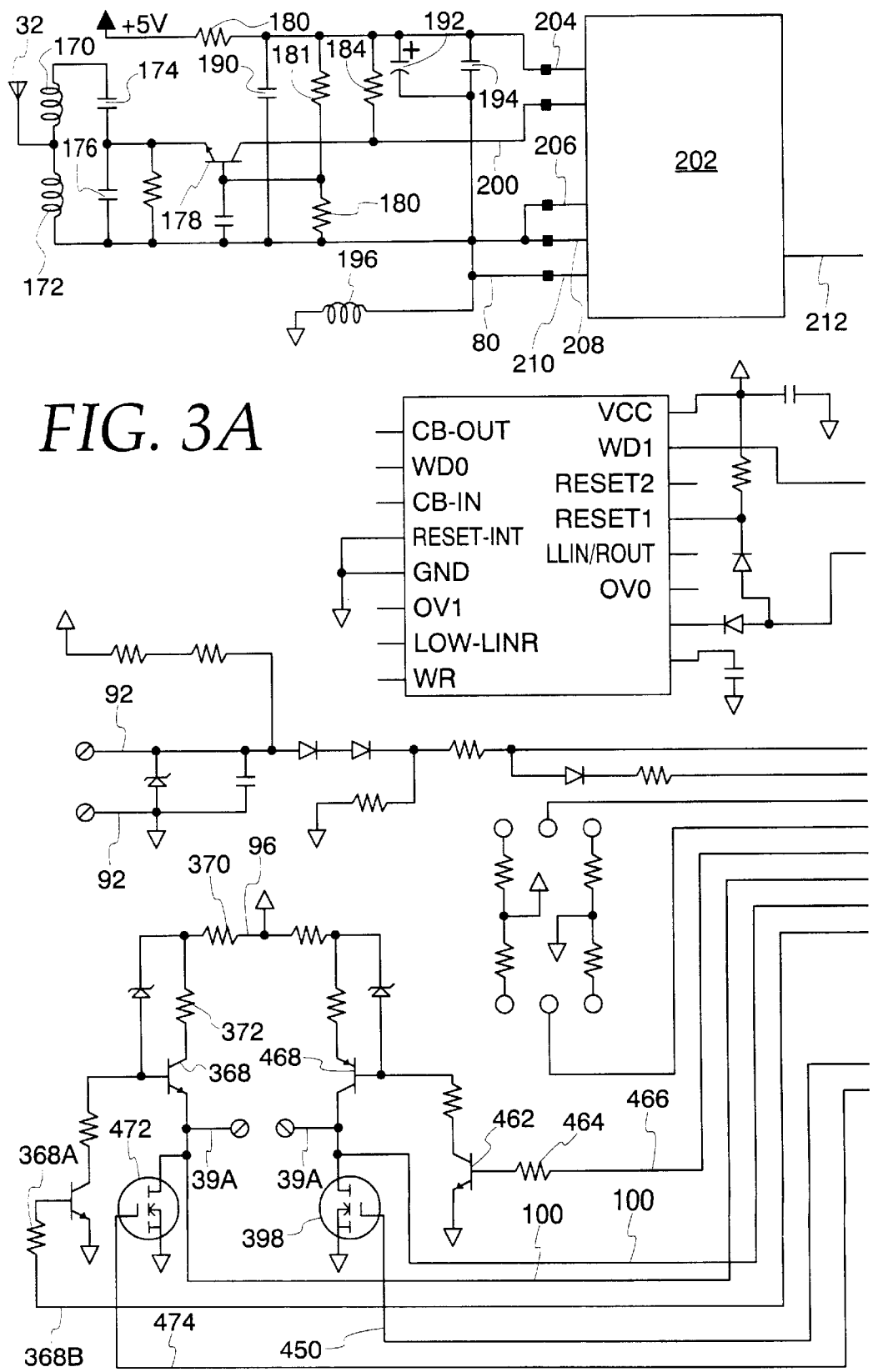
FIG. 3 is a schematic diagram of the controller shown in block format in FIG. 2.
Figure 3B:
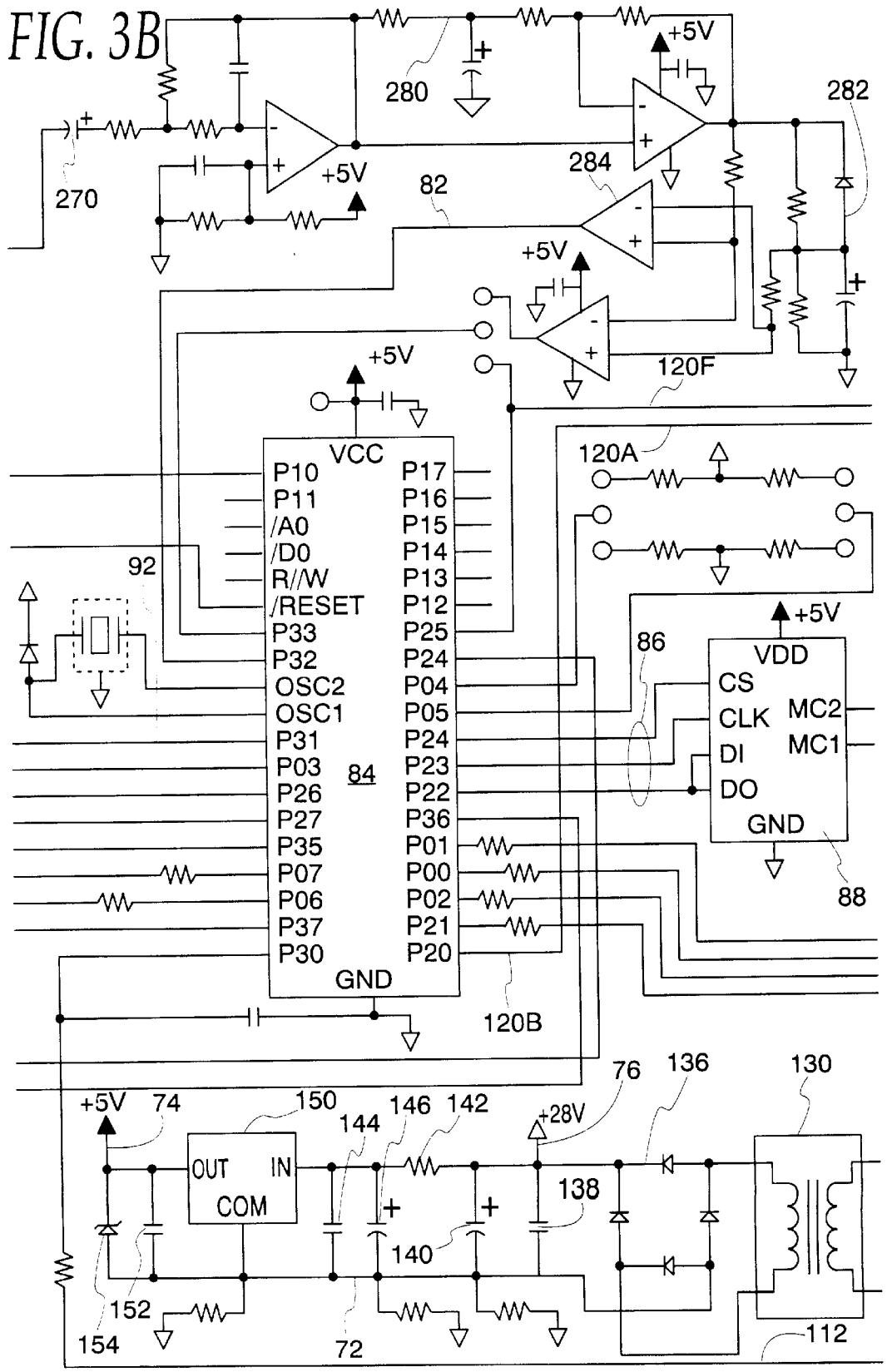
Figure 3C:
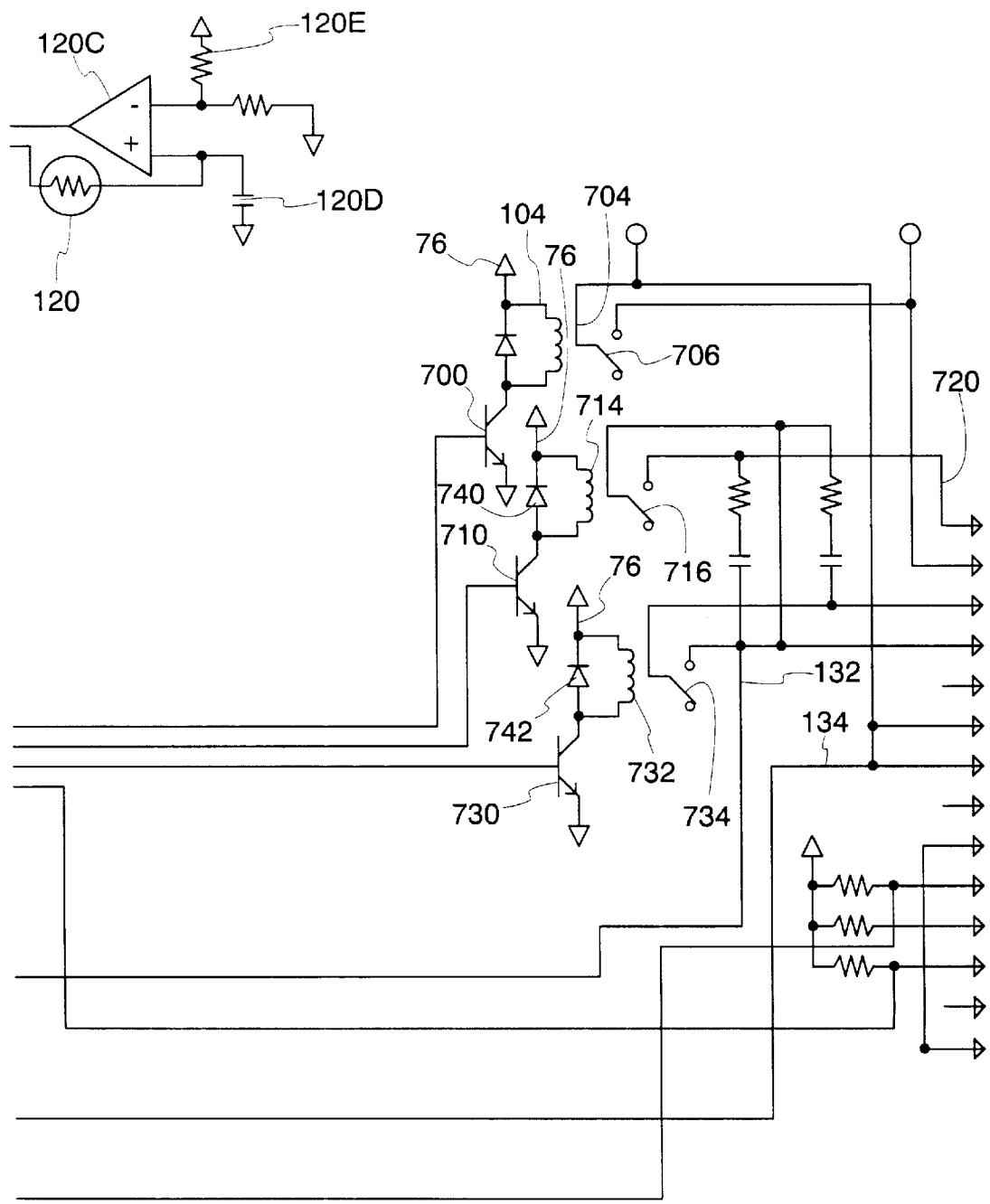

As shown in FIGS. 2 and 3, the garage door operator 10, which includes the head unit 12 has a controller 70 which includes the antenna 32. The controller 70 includes a power supply 72 which receives alternating current from an alternating current source, such as 110 volt AC, and converts the alternating current to +5 volts zero and 24 volts DC. The 5 volt supply is fed along a line 74 to a number of other elements in the controller 70. The 24 volt supply is fed along the line 76 to other elements of the controller 70. The controller 70 includes a super-regenerative receiver 80 coupled via a line 82 to supply demodulated digital signals to a microcontroller 84. The receiver is energized by a line 85 coupled to the line 74. The microcontroller 84 is also coupled by a bus 86 to a non-volatile memory 88, which non-volatile memory stores set points and other customized digital data related to the operation of the control unit. An obstacle detector 90, which comprises the emitter 42 and infrared detector 46 is coupled via an obstacle detector bus 92 to the microcontroller 84. The obstacle detector bus 92 includes lines 44 and 48. The wall switch 39 is connected via the connecting wires 39a to a switch biasing module 96 which is powered from the 5 volt supply line 74 and supplies signals to and is controlled by the microcontroller 84 a bus 100 coupled to the microcontroller 84. The microcontroller 84 in response to switch closures, will send signals over a relay logic line 102 to a relay logic module 104 connected to an alternating current motor 106 having a power take-off shaft 108 coupled to the transmission 18 of the garage door operator. A tachometer 110 is coupled to the shaft 108 and provides a tachometer signal on a tachometer line 112 to the microcontroller 84, the tachometer signal being indicative of the speed of rotation of the motor.

The power supply 72 includes a transformer 130 which receives alternating current on leads 132 and 134 from an external source of alternating current. The transformer steps down the voltage to 24 volts and feeds 24 volts to a pair of capacitors 138 and 140 which provide a filtering function. A 24 volt filtered DC potential is supplied on the line 76 to the relay logic 104. The potential is fed through a resistor 142 across a pair of filter capacitors 144 and 146, which are connected to a 5 volt voltage regulator 150, which supplies regulated 5 volt output voltage across a capacitor 152 and a Zener diode 154 to the line 74.

Figure 4:
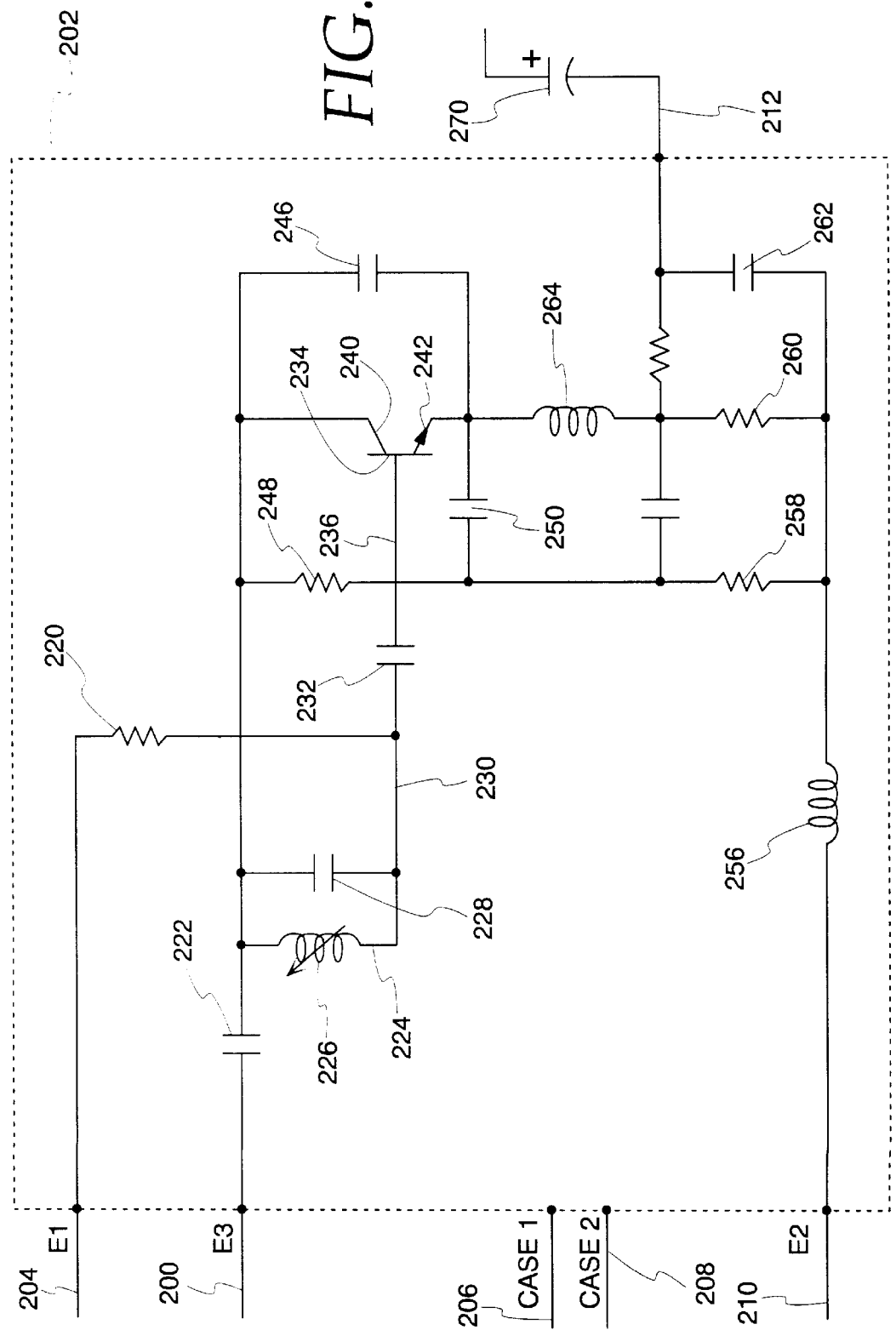
FIG. 4 is a schematic diagram of a receiver module shown in the schematic diagram of FIG. 3.

Signals may be received by the controller at the antenna 32 and fed to the receiver 80. The receiver 80 includes a pair of inductors 170 and 172 and a pair of capacitors 174 and 176 that provide impedance retching between the antenna 32 and other portions of the receiver. An NPN transistor 178 is connected in common base configuration as a buffer ampli-fier. Bias to the buffer amplifier transistor 178 is provided by resistors 180. A resistor 186, a capacitor 190, a capacitor 192 and a capacitor 194 provide filtering to isolate a later receiver stage from the buffer amplifier 178. An inductor 196 also provides power supply buffering. The buffered RF output signal is supplied on a line 200, coupled between the collector of the transistor 178 and a receiver module 202 which is shown in FIG. 4. The lead 204 feeds into the unit 202 and is coupled to a biasing resistor 220 The buffered radio frequency signal is fed via a coupling capacitor 222 to a tuned circuit 224 comprising a variable inductor 226 connected in parallel with a capacitor 228. Signals from the tuned circuit 224 are fed on a line 230 to a coupling capacitor 232 which is connected to an NPN transistor 234 at its base 236. The transistor has a collector 240 and emitter 242. The collector 240 is connected to a feedback capacitor 246 and a feedback resistor 248. The emitter is also coupled to the feedback capacitor 246 and to a capacitor 250. The line 210 is coupled to a choke inductor 256 which provides ground potential to a pair of resistors 258 and 260 as well as a capacitor 262. The resistor 258 is connected to the base 236 of the transistor 234. The resistor 260 is connected via an inductor 264 to the emitter 242 of the transistor. The output signal from the transistor is fed outward on a line 212 to an electrolytic capacitor 270.

As shown in FIG. 3, the capacitor 270 capacitively couples the demodulated radio frequency signal to a band-pass amplifier 280 to an average detector 282 which feeds a comparator 284. The comparator 284 also receives a signal directly from the bandpass amplifier 280 and provides a demodulated digital output signal on the line 82 coupled to the P32 pin of the Z86E21/61 microcontroller 84. The microcontroller 84 energized by the power supply 72 and also controlled by the wall switch 39 coupled to the micro-controller by the leads 100.

From time to time, the microcontroller will supply current to the switch biasing module 96.

Figure 5A:
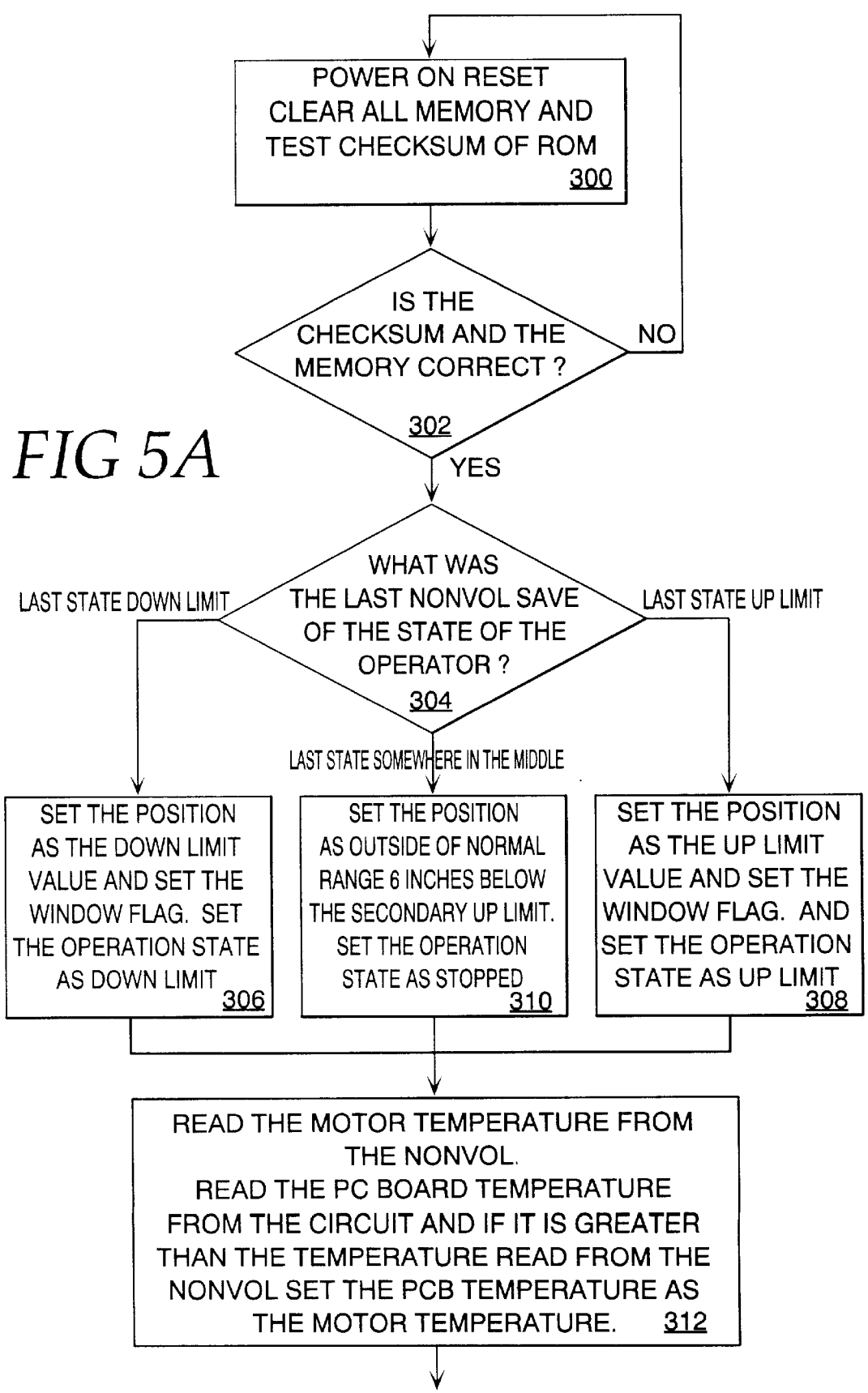
FIG. 5A–B are a flow chart of a main routine that executes in a microcontroller of the control unit.
Figure 5B:
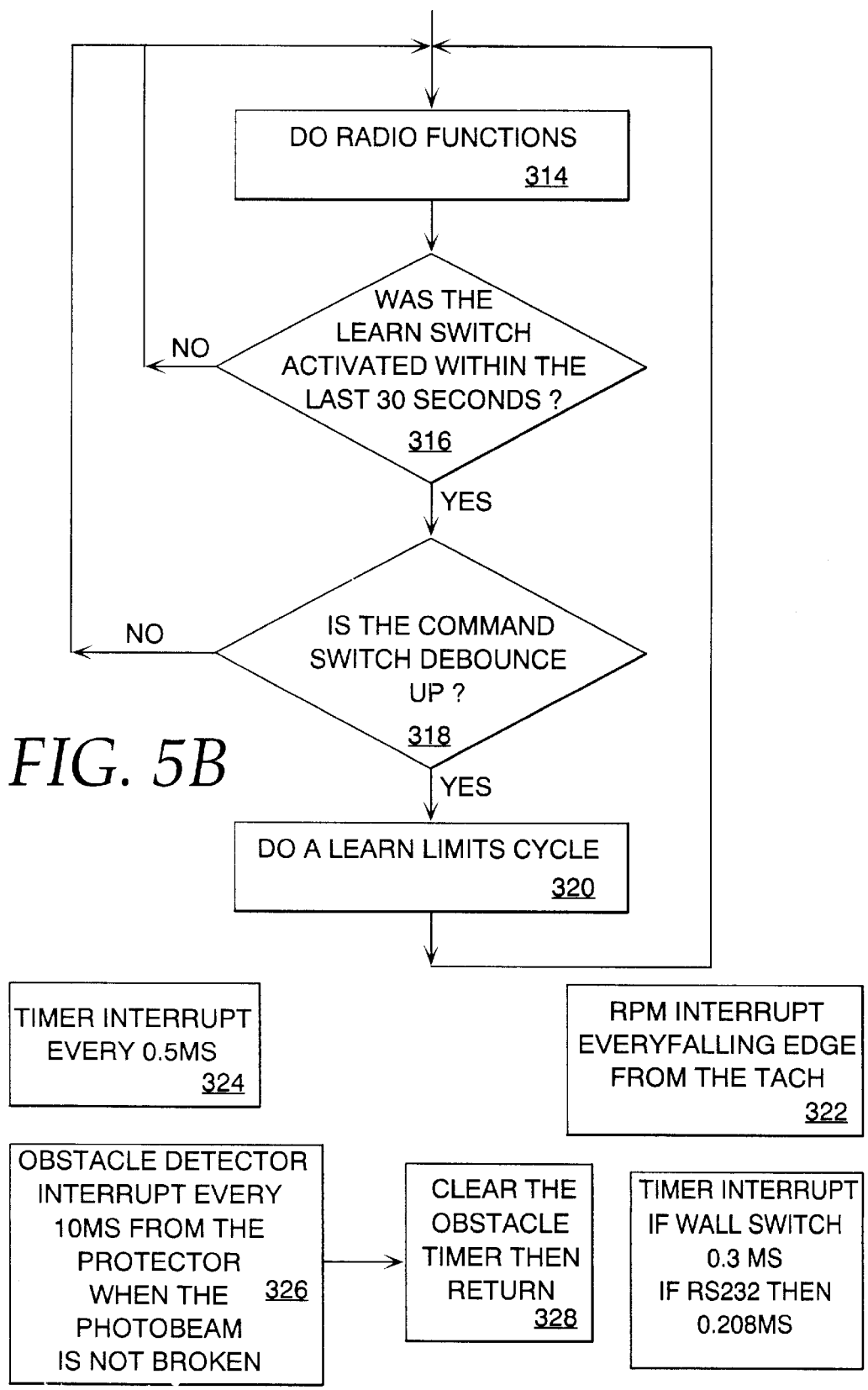

The microcontroller operates under the control of a main routine as shown in FIGS. 5A and 5B. When the unit is powered up, a power on reset is performed in a step 300, the memory is cleared and a check sum from read-only memory within the microcontroller 84 is tested. In a step 302, if the check sum and the memory prove to be correct, control is transferred to a step 304, if not, control is transferred back to the step 300. The last non-volatile state, which is indicative of the state of the operator, that is whether the operator indicated the door was at its up, limit, down limit or in the middle of its travel, is tested fox in a step 304 and if the last state is a down limit, control is transferred to a step 306. If it was an up limit, control is transferred to a step 308. If it was neither a down nor an up limit, control is transferred to a step 310. In the step 306, the position is set as the down limit value and a window flag is set. The operation state is set as down limit. In a step 308, the position is set as up, the window flag is set and the operation state is set as up limit. In the step 310, the position is set as outside the normal range, 6 inches below the secondary up limit. The operation state is set as stopped. Control is transferred from any of steps 306, 308 and 310 to a step 312 where a stored simulated motor temperature is read from the non-volatile memory 88. The temperature of a printed circuit board positioned within the head unit is read from the temperature sensor 120 which is supplied over a line 120a to the microcontroller. In order to read the PC board temperature, a pin P20 of the microprocessor 84 is driven high, causing a high potential to appear on a line 120b which supplies a current through the RTD sensor, 120 to a comparator 120c. A capacitor 120d connected to the comparator and to the temperature sensor, is grounded and charges up. The other input terminal to the comparator has a voltage divider 120e connected to it to supply a reference voltage of about 2.5 volts. Thus, the microcontroller starts a timer running when it brings line 120b high and interrogates a line 120f to determine its state. The line 120f will be drive; high when the temperature at the junction of the RTD 120 and the capacitor 120d exceeds 2.5 volts. Thus, the time that it takes to charge the capacitor through the resistance is indicative of the temperature within the head unit and, in this manner, the PC board temperature is read and if the temperature as read is greater than the temperature retrieved from the non-volatile memory, the temperature read from the PC board is then stored as the motor temperature.

In a step 314, constants related to the receipt and processing of the demodulated signal on the line 82 are initialized. In a step 316, a test is made to determine whether the learn switch 39b had been activated within the last 30 seconds. If it has not, control is transferred back to the step 314.

In a, step 318, a test is made to determine whether the command switch debounce timer has expired. If it has, control is transferred to a step 320. If it is not, control is transferred back to the step 314. In the step 320, the learn limit cycle is begun as will be discussed in more detail as to FIGS. 6A through 6G. The main routine effectively has a number of interrupt routines coupled to it. In the event that a falling edge is detected on the line 112 from the tachometer, an interrupt routine related to the tachometer is serviced in the step 322. A timer interrupt occurs every 0.5 millisecond in a step 324 as shown in FIGS. 7A through 7B.

The obstacle detector 90 generates a pulse every 10 milliseconds during the time when the beam from the infrared emitter 42 has not been interrupted either by the pass point system 49 or by an obstacle, in a step 326 following which the obstacle detector timer is cleared in a step 328.

Figure 10A:
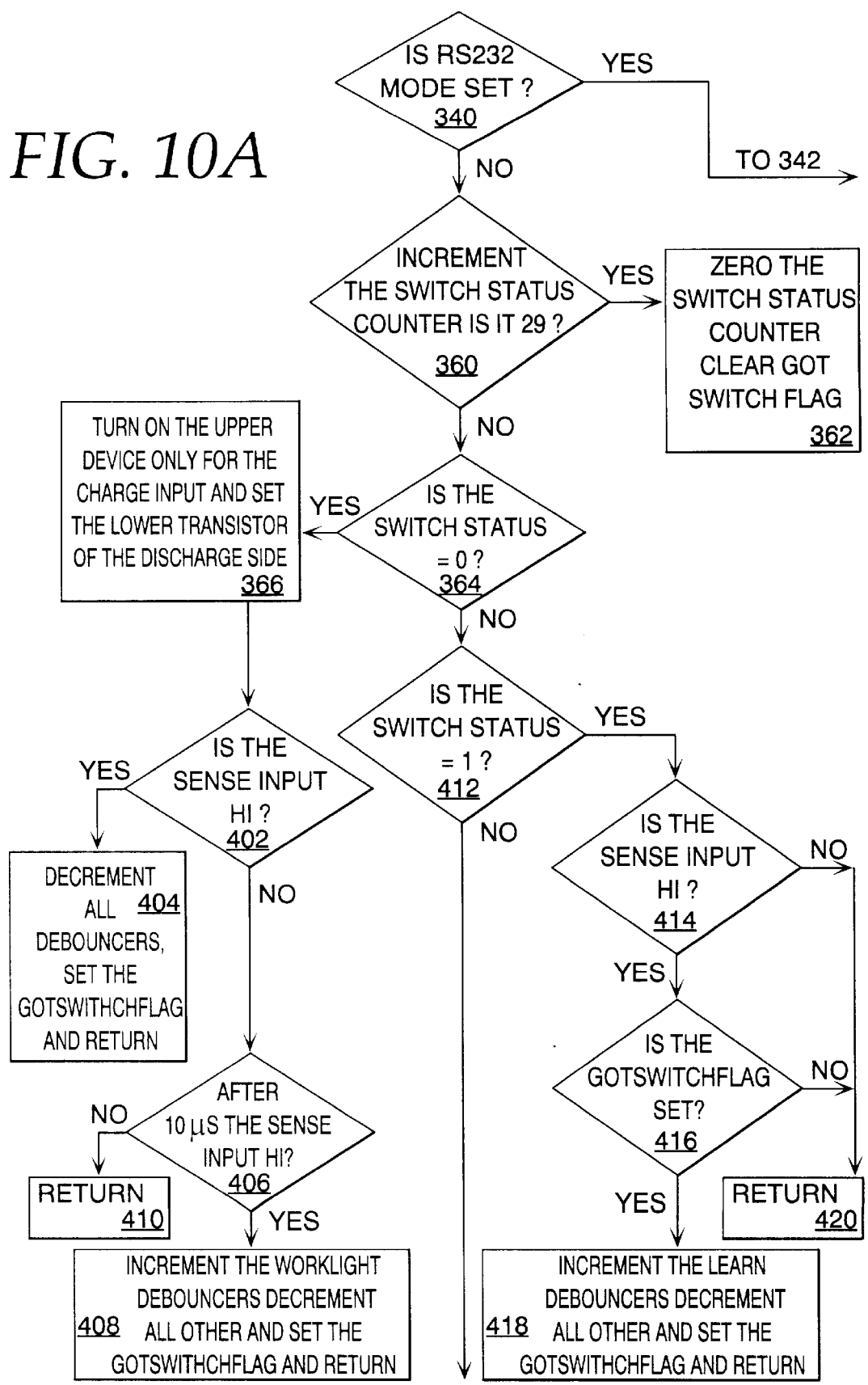
FIGS. 10A–C are flow charts of the switch input routines from the switch module.
Figure 10B:
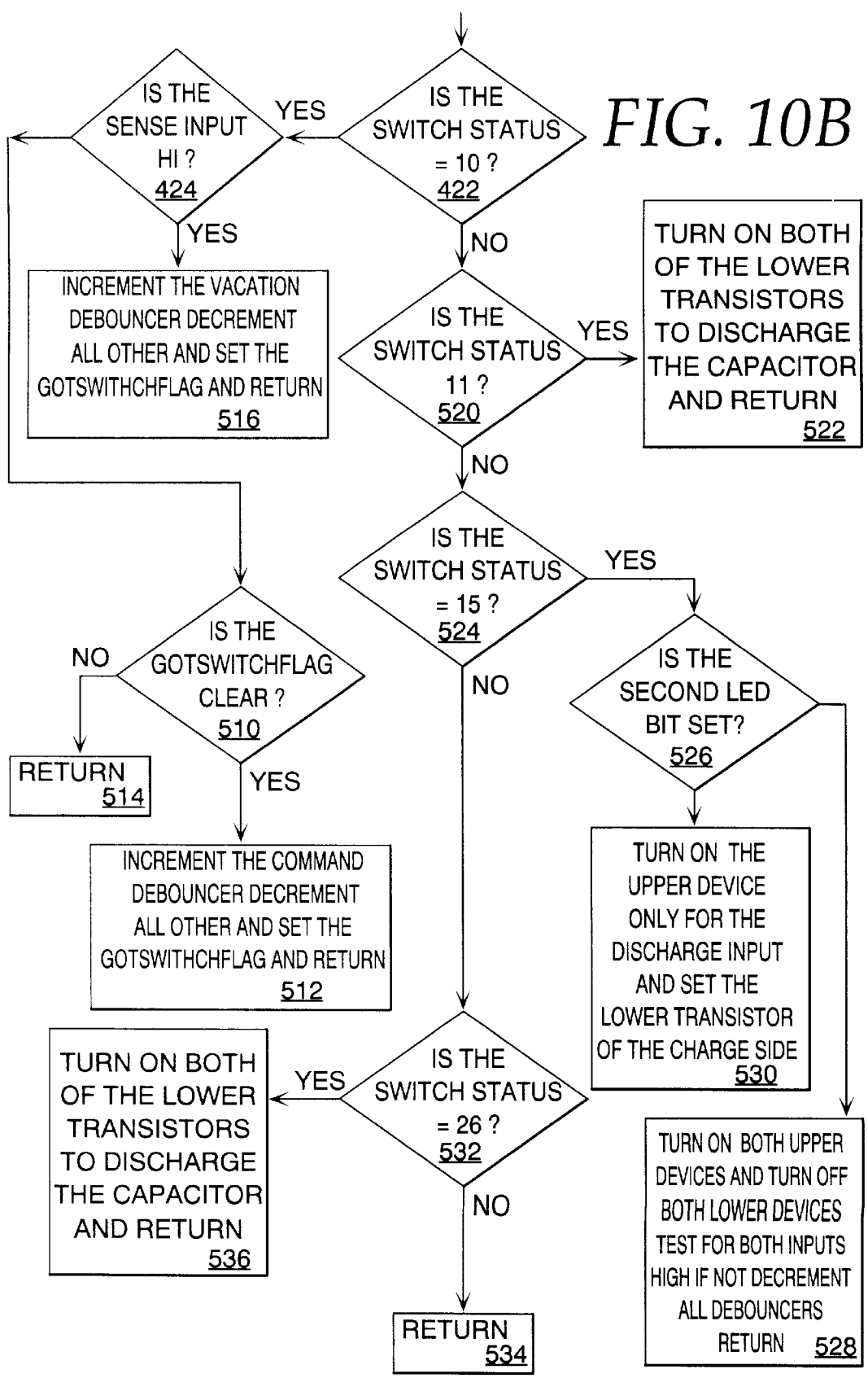
Figure 10C:
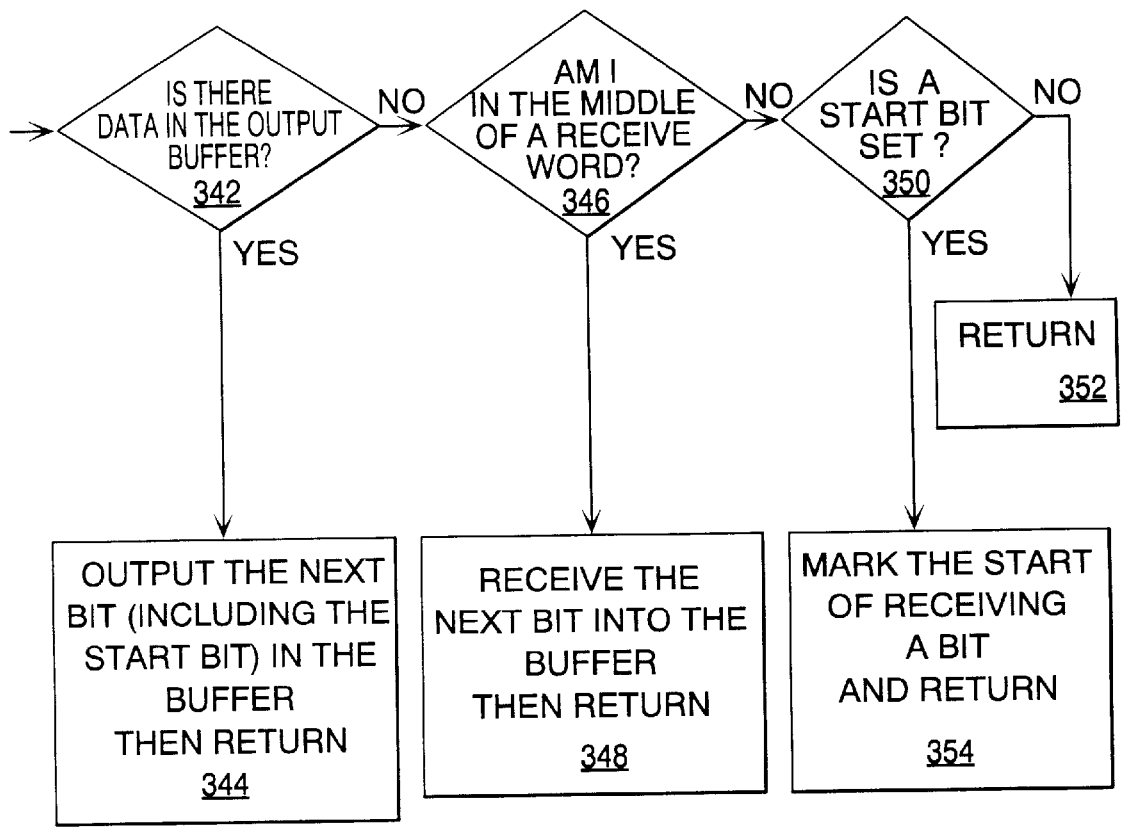
Figure 11:
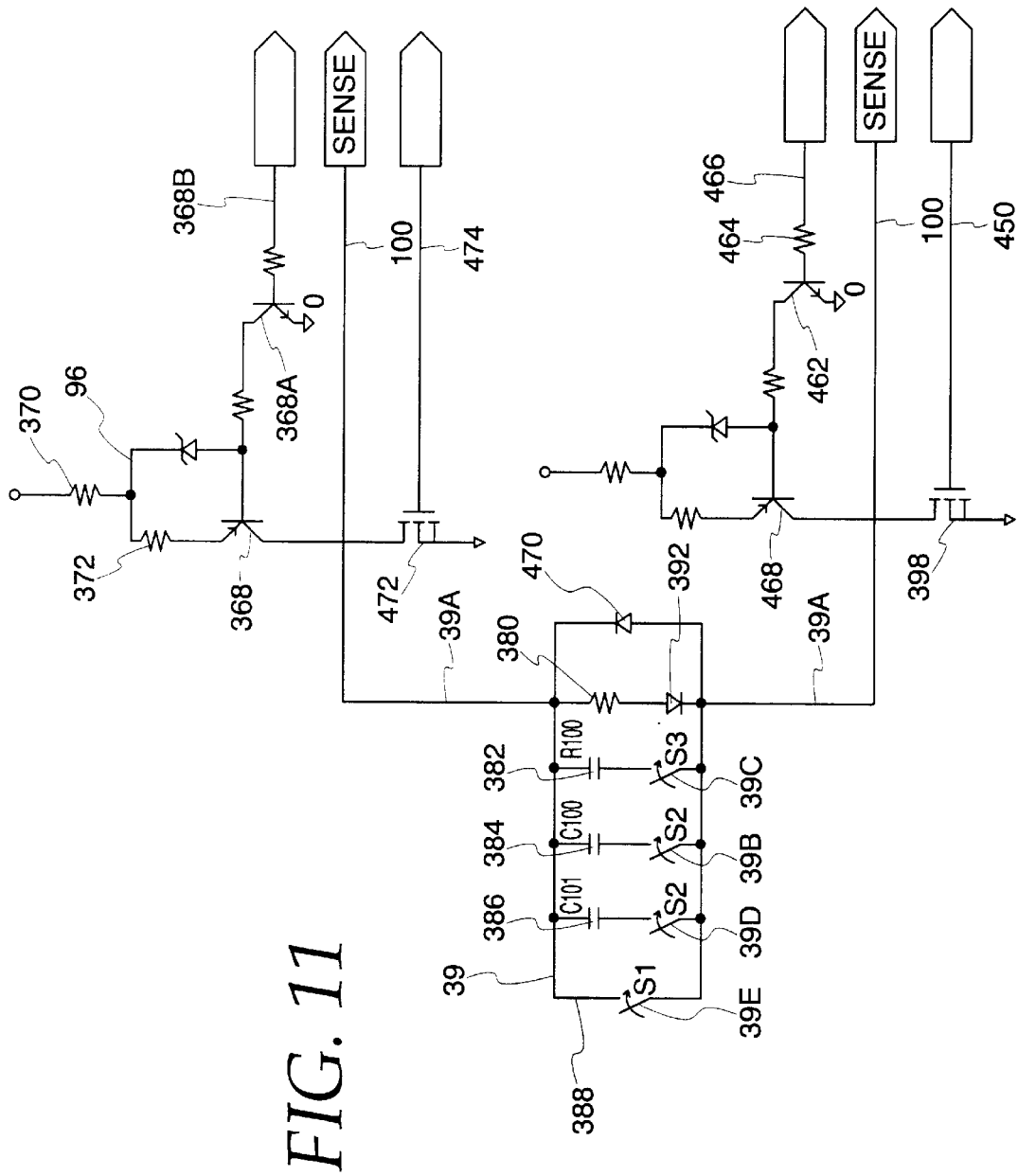
FIG. 11 is a schematic diagram of the switch module and the switch biasing circuit.

As shown in FIGS. 10A–C and 11, operation of the switch biasing module 96 is controlled over the lines 100 by the microcontroller 84. The microcontroller 84, in the step 340, tests to determine whether an RS232 digital communications mode has been set. If it has, control is transferred to a step 342, as shown in FIG. 10C, testing whether data is stored in an output buffer to be output from the microcontroller 84 If it is, control is transferred to a step 344 outputting the next bit, which may include a start bit, from the output buffer and control is then transferred back to the main routine. In the event that there is no data in the data buffer, control is transferred to the step 346, testing whether data is being received over lines 100. If it is being received, control is transferred to a step 349 to receive the next bit into the input buffer and the routine is then exited. If not, control is transferred to a step 350. In the step 350, a test is made to determine whether a start bit for RS232 signaling has been received. If it has not, control is transferred to a return step 352. If it has, control is transferred to a step 354 in which a flag is set indicating that the start bit has been received and the routine is exited. As shown in FIG. 10A, if the response to the decision block 340 is no, control is transferred to a decision step 360. The switch status counter is incremented and then a test is determined as to whether the contents of the counter are 29. If the switch counter is 29, control is transferred to a step 362 causing the counter to be zeroed. If the counter is not 29, control is transferred to a step 364, testing for whether the switch status is equal to zero. If the switch status is equal to zero, control is transferred to a step 366. In a step 366 a current source transistor 368, shown in FIG. 11, is switched on, drawing current through resistors 370 and 372 and feeding current u through a line 39e connected thereto to the module 39 and, more specifically, to a resistor 380, a 0.10 microfarad capacitor 382, a 1 microfarad capacitor 384, a 10 microfarad capacitor 386 and a switch terminal 388. The switch 39e is coupled to the switch terminal 388. The switch 39d may be selectively coupled to the capacitor 386. The switch 39b may be selectively coupled to the capacitor 384. The switch 39c may be selectively coupled to the capacitor 382. A light emitting diode 392 is connected to the resistor 380. Current flows through the resistor 380 and the light emitting diode 392 back to another one of the lines 39a and through a field effect transistor 398 to ground. In step 402, the sense input on a line 100 coupled to the transistor 398 is tested to determine whether the input is high. If the input is high immediately, that is indicative of the fact that switches 39b through 39e are all open and in a step 404, debounce timers are decremented for all switches and a got switch f lag is set and the routine is exited. In the event that the test of step 402 is negative, control is then transferred erred to a step 406 testing after 10 microseconds, if the sense in output on the line 100 connected to the field effect transistor 398 is high, which would be indicative of the switch 39c having been closed. If it is high, step 408 indicates the worklight timer is incremented, all other switch timers are decremented, the got switch flag is set and the routine is exited. In the event that the decision in step 406 is in the negative, control is transferred to a step 410 and the routine is exited. In the event that the decision from step 364 is in the negative, control is transferred to a step 412 wherein the switch status is tested as to whether it is equal to one. If it is, control is transferred to a step 414 testing whether the sensed input on the line 100 connected to the field effect transistor is high. If it is, control is transferred to step 416 to determine the got switch flag is set. If it is, control is transferred to a step 418, where the learn switch debouncer is incremented, all other switch counters are decremented, the got switch flag is set and the routine is exited. In the event that the answer to step 414 or 416 is in the negative, control is transferred to a return step 420.

In the event that the answer to step 412 is in the negative, control is transferred to a step 422, as shown in FIG. 10B. A test is made as to whether the switch status is equal to 10. If it is, control is transferred to a step 424 where the sense out input is tested as high.

Thus, the charging rate for the capacitors which, in effect, is sensed on the line 100 connected to the field effect transistor 398 which is coupled to ground, is indicative of which of the switches is closed because the switch 39c has a capacitor that charges at 10 times the rate of the capacitor 384 connected to 39b and 100 times the rate of the capacitor 386 selectively coupleable to switch 39d.

After the switch measurement has been made, the transistor 368 is switched non-conducting by the line 368b and the field effect transistor 398 is switched non-conducting by a line 450 connected to its gate. A transistor 462, coupled via a resistor 464 to a line 466, is switched on, biasing a transistor 460 on, causing current to flow through a diagnostic light emitting diode 470 to a field effect transistor 472 which is switched on via a voltage on a line 474. In addition, the capacitors 386, 384 and 382, which may have been charged are discharged through the field effect transistor 472.

In order to perform all of the switching functions after the step 424 has been executed, control is transferred to a step 510 testing whether the got switch flag has been cleared. If it has, control is transferred to a step 512 in which the command timer is incremented and all other timers are decremented and the got switch flag is set and the routine is exited. If the got switch flag has not been cleared as detected the step 510, the routine is exited in the step 514. In the event that the sense input is measured as being high in the step 424, control is transferred to a step 516 where the vacation or lock flag counter is incremented and all other counters are decremented The got switch flag is set and the routine is exited. In the event that the switch status equal 10 test in the step 422 is indicated to be no, control is then transferred to a step 520 testing whether the switch status is 11. If the switch status is 11, indicating that the routine has been swept through 11 times, control is transferred to a step 522 in which the field effect transistors 398 and 472 are both switched on, providing ground pads on both sides of the capacitors causing the capacitors to discharge and the routine is then exited. In the event that the step 520 test is negative, control is transferred to a step 524 testing whether the routine has been executed 15 times. If it has, control is transferred to a step 526 to determine if the bit which controls the status of light emitting diode 470, the diagnostic light emitting diode, has been set. If it has not been set, control is transferred to a step 528 wherein both transistors 368 and 468 are switched on and both the field effect transistors 398 and 472 are switched off. In order to test for short circuits between the source and drain electrodes of the field effect transistors 398 and 472 which might cause false operation signals to be supplied on the lines 100 to the microcontroller 84, insulting in inadvertent operation of the electric motor. The routine is then exited. In the event that the test in step 526 indicates chat the diagnostic LED bit has been set, control is transferred to a step 530. In the step 530, the transistors 468 and 472 are switched on allowing current to flow through the diagnostic LED 470. In the event that the test in step 524 is negative, a test is made in a step 532 as to whether the routine has been executed 26 times. If it has not, the routine is exited in a step 534. If it has, both of the field effect transistors 398 and 372 are switched on to connect all of the capacitors to ground to discharge the capacitors and the routine is exited.

As shown in FIGS. 7A and 7B, when the timer interrupt occurs as in step 324, control is transferred to a step 550 shown in FIG. 7A wherein a test is made to determine whether a 2 millisecond timer has expired. If it has not, control is transferred to a step 552 determining whether a 500 millisecond timer has expired. If the 500 millisecond timer has expired, control is transferred to a step 554 testing whether power has been switched on through the relay logic 104 to the electric motor 106. If the motor has been switched on, control is transferred to a step 556 testing whether the motor is stalled, as indicated by the motor power having been switched on and by the fact that pulses are not coming through on the line 112 from the tachometer 110. In the event that the motor has stalled, control is transferred to a step 558. In the step 558 the existing motor temperature indication, as stored in one of the registers of the microcontroller 84, has added to it a constant which is related to a motor characteristic which is added in when the motor is indicated to be stalled. In the event that the response to the step 556 is in the negative, indicating that the motor is not stalled, control is transferred to a step 560 wherein the motor temperature is updated by adding a running motor constant to the motor temperature. In the event that the response to the test in step 554 is in the negative, indicating that motor power is not on and that heat is leaking out of the motor so that the temperature will be dropping, the new motor temperature is assigned as being equal to the old motor temperature, less the quantity of the old motor temperature, minus the ambient temperature measured from the RTD probe 120, the whole difference multiplied by a thermal decay fraction which is a number.

All of steps 558, 560 and 562 exit to a step 564 which test as to whether a 15 minute timer has timed out. If the timer has timed out, control is transferred to a step 566 causing the current, or updated motor temperature, to be stored in a non-volatile memory 88. If the 15 minute timer has not been timed out, control is transferred to a step 568, as shown in FIG. 7B. Step 566 also exits to step 568. A test is made in the step 568 to determine whether a obstacle detector interrupt has come in via step 326 causing the obstacle detector timer to have been cleared. If it has not, the period will be greater than 12 milliseconds, indicating that the obstacle detector beam has been blocked. If the obstacle detector beam, in fact, has been blocked, control is transferred to a step 570 to set the obstacle detector flag.

In the event that the response to step 568 is in the negative, the obstacle detector flag is cleared in the step 572 and control is transferred to a step 574. All operational timers, including radio timers and the like are incremented and the routine is exited.

Figure 8B:
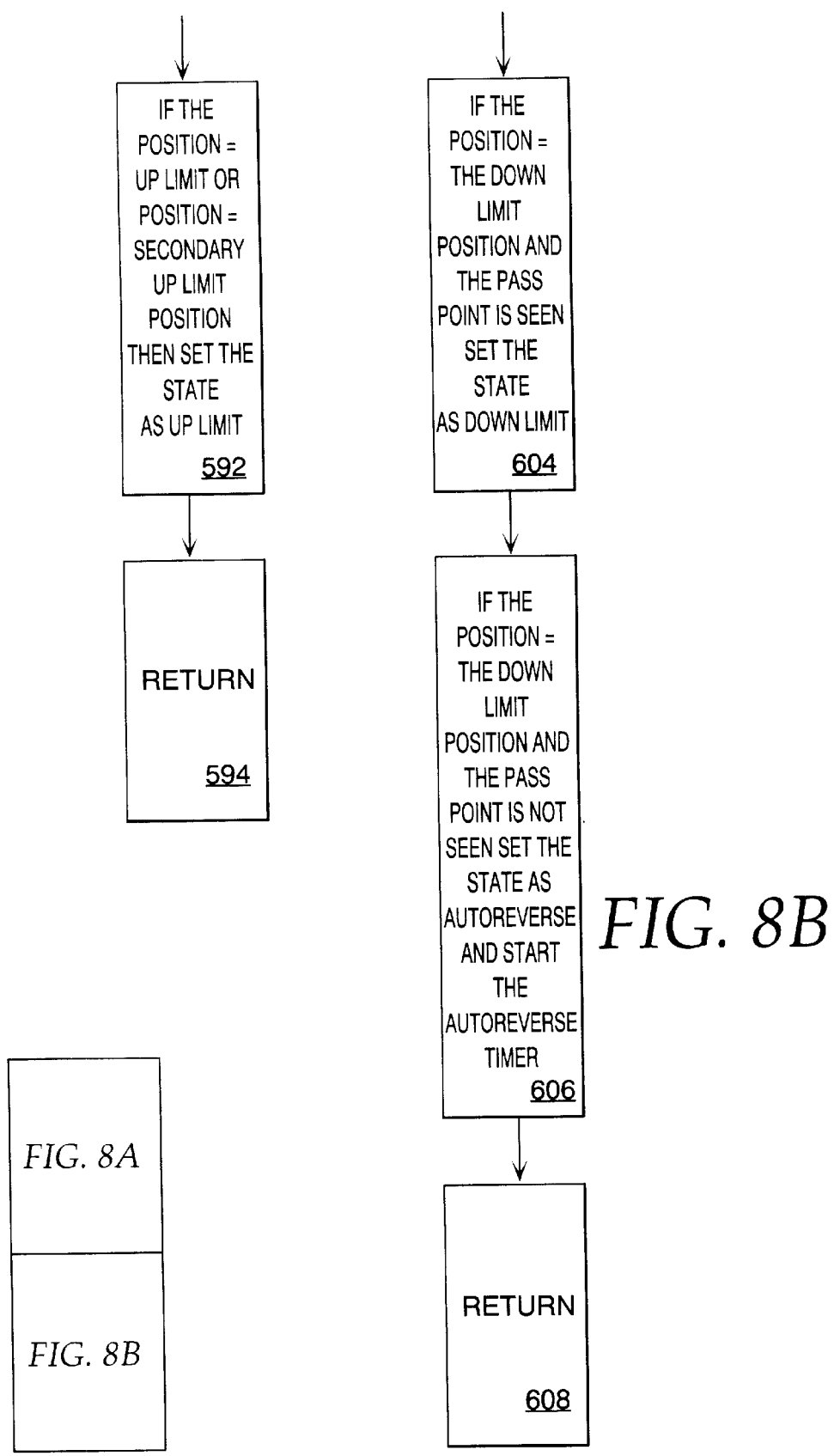

In the event that the 2 millisecond timer tested for in the step 550 has expired, control is transferred to a step 576 which calls a motor operation routine. Following execution of the motor operation routine, control is transferred to the step 552. When the motor operation routine is called, as shown in FIG. 8A, a test is made in a step 580 to determine the status of the motor operation state variable which may indicate if the up limit has been reached, the motor is causing the door to travel up or down, the door has stopped in mid-travel or an auto-reverse delay indicating that the motor has stopped in mid-travel and will be switching into up travel shortly. In the event that there is an auto-reverse delay, control is transferred to a step 582, when a test is made for a command from one of the radio transmitters or from the wall control unit and, if so, the state of the motor is set indicating that the motor has stopped in add-travel. Control is then transferred to a step 584 in which 0.50 second timer is tested to determine whether it has expired. If it has, the state is set to the up travel state following which the routine is exited in the step 586. In the event that the operation state is in the up travel state, as tested for in step 580, control is transferred to a step 588 testing for a command from a radio or wall control and if the command is received, the motor operational state is changed to stop in mid-travel. Control is transferred to a step 590. If the force period indicated is longer than that stored in an up array location, indicated by the position of the motor. The state of the door is indicated as stopped in mid-travel. Control is then transferred to a step 592 testing whether the current position of the door is at the up limit, then the state of the door is set as being at the up limit and control is transferred to a step 594 causing the routine to be exited, as shown in FIG. 8B.

In the event that the operational state tested for in the step 580 is indicated to be at the up limit, control is transferred to a step 596 which tests for a command from the radio or wall control unit and a test is made to determine whether the motor temperature is below a set point for the down travel motor temperature threshold. The state is set as being a down travel state. If the temperature value exceeds the threshold or set point temperature value, an output diagnostic flag is set for providing an output indication in another routine. Control is then transferred to a step 598, causing the routine to be exited. In the event that the down travel limit has been reached, control is transferred to a step 600 testing for whether a command has come in from the radio or wall control and, if it has, the state is set as auto-reverse and the auto-reverse timer is cleared. Control is then transferred to a step 602 testing whether the force period, as indicated, is longer than the force period stored in the down travel array for the current position of the door. Auto-reverse is then entered at step 582 on a later iteration of the routine. Control is transferred to a step 604 to test whether the position of the door is at the down limit position and the pass point detector has already indicated that the door has swept the passed the pass point, the state is set as a down limit state and control is transferred to a step 606 testing for whether the door position is at the down limit position and testing for whether tie pass point has been detected. If the pass point has not been detected, the motor operational state is set to auto-reverse, causing auto-reverse to be entered in a later routine and control is transferred to a step 608, exiting the main routine.

in the event that the block 580 indicates that the door is at the down limit, control is transferred to a step 610, testing for a command from the radio or wall control and testing the current motor temperature. If the current motor temperature is below the up travel motor temperature threshold, then the motor state variable is set as equal to up travel. If the temperature is above the threshold or set point temperature, a diagnostic code flag is then set for later diagnostic output and control is transferred to a return step 612. In the event that the motor operational state is indicated as being stopped in mid-travel, control is transferred to a step 614 which tests for a radio or wall control command and tests the motor temperature value to determine whether it is above or below a down travel motor temperature threshold. If the motor temperature is above the travel threshold, then the door is left stopped in mid-travel and the routine is returned from in step 616.

Figure 6A:
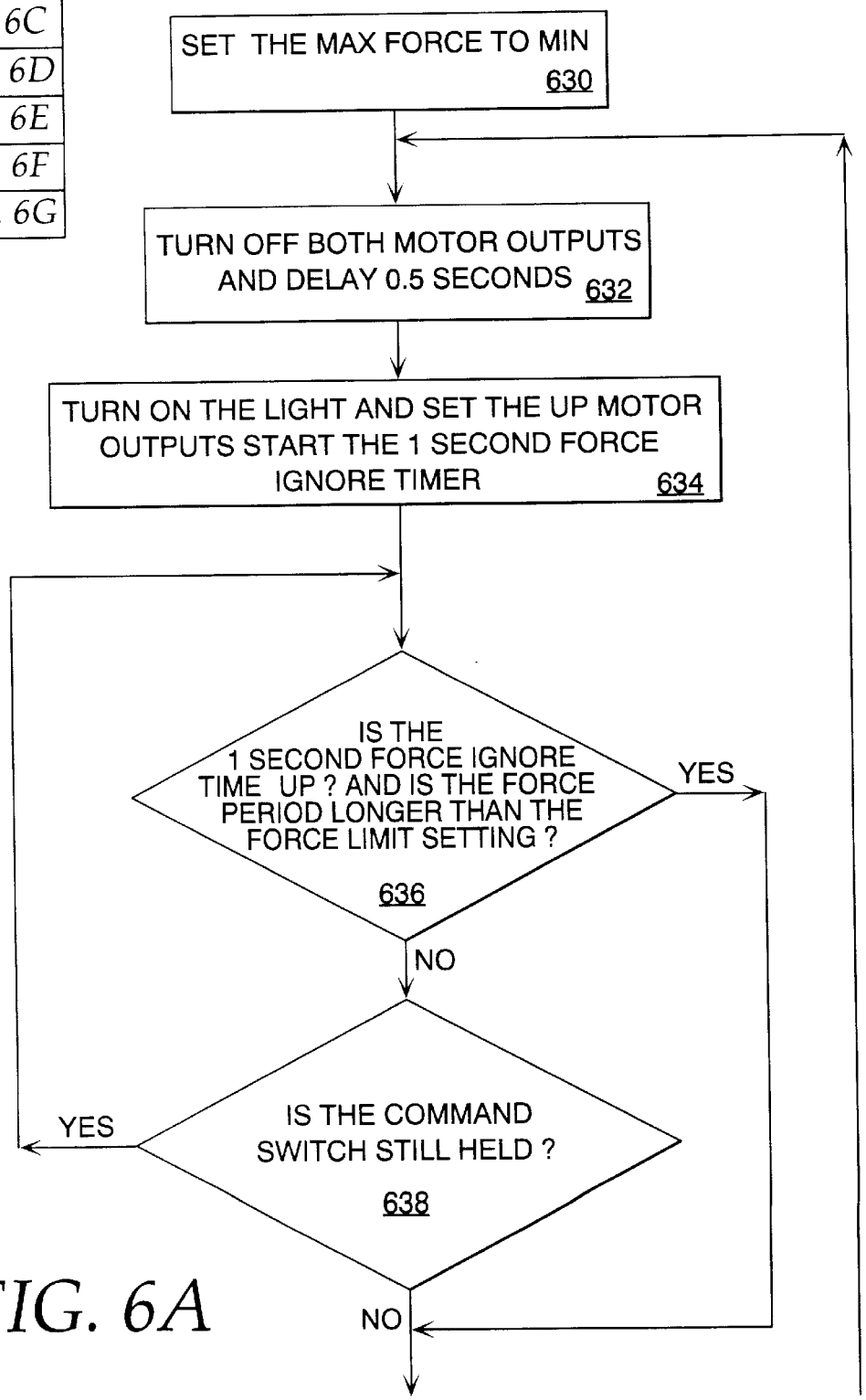
FIGS. 6A–G, are a flow diagram of a learn routine executed by the microcontroller.
Figure 6B:
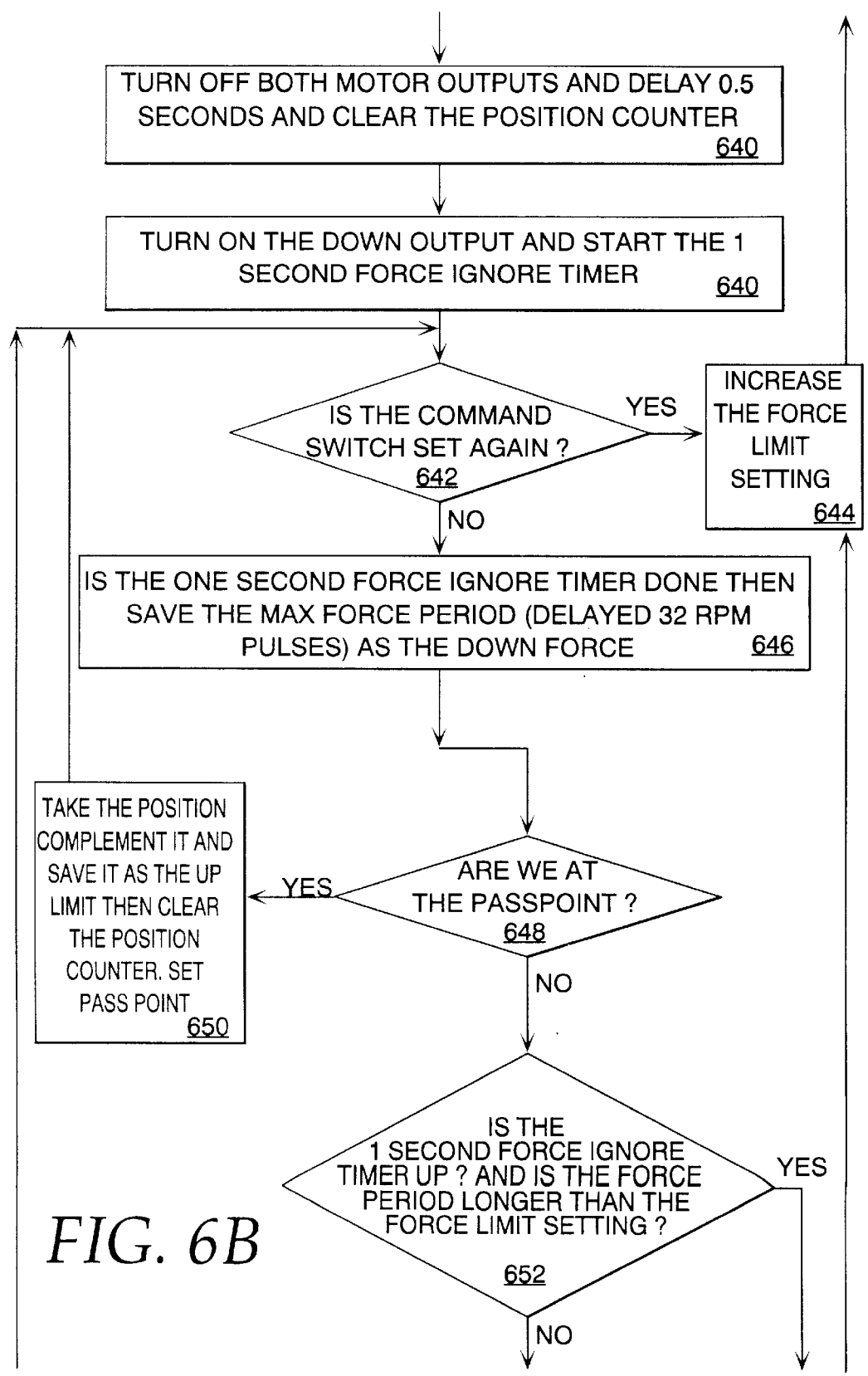
Figure 6C:
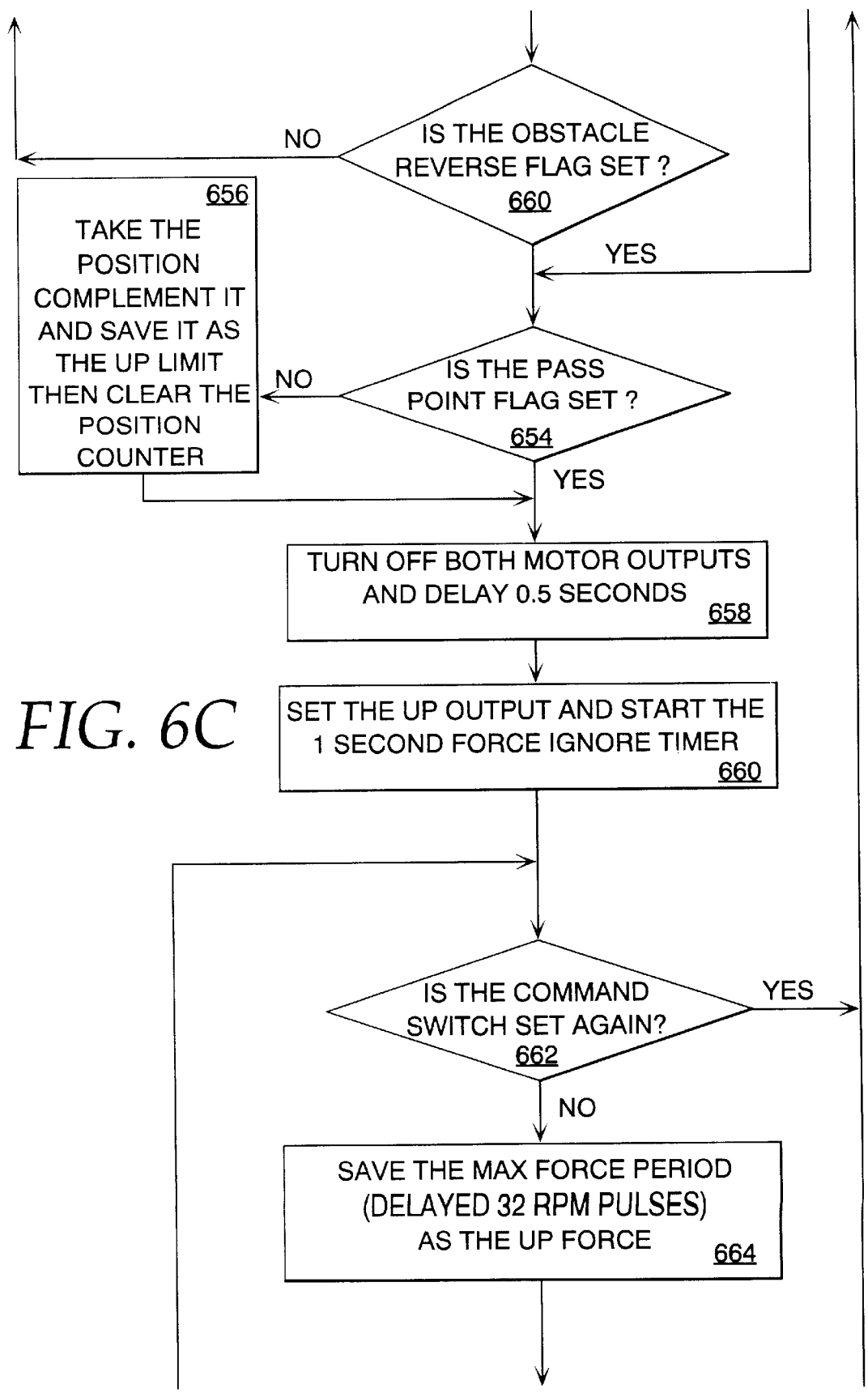
Figure 6D:
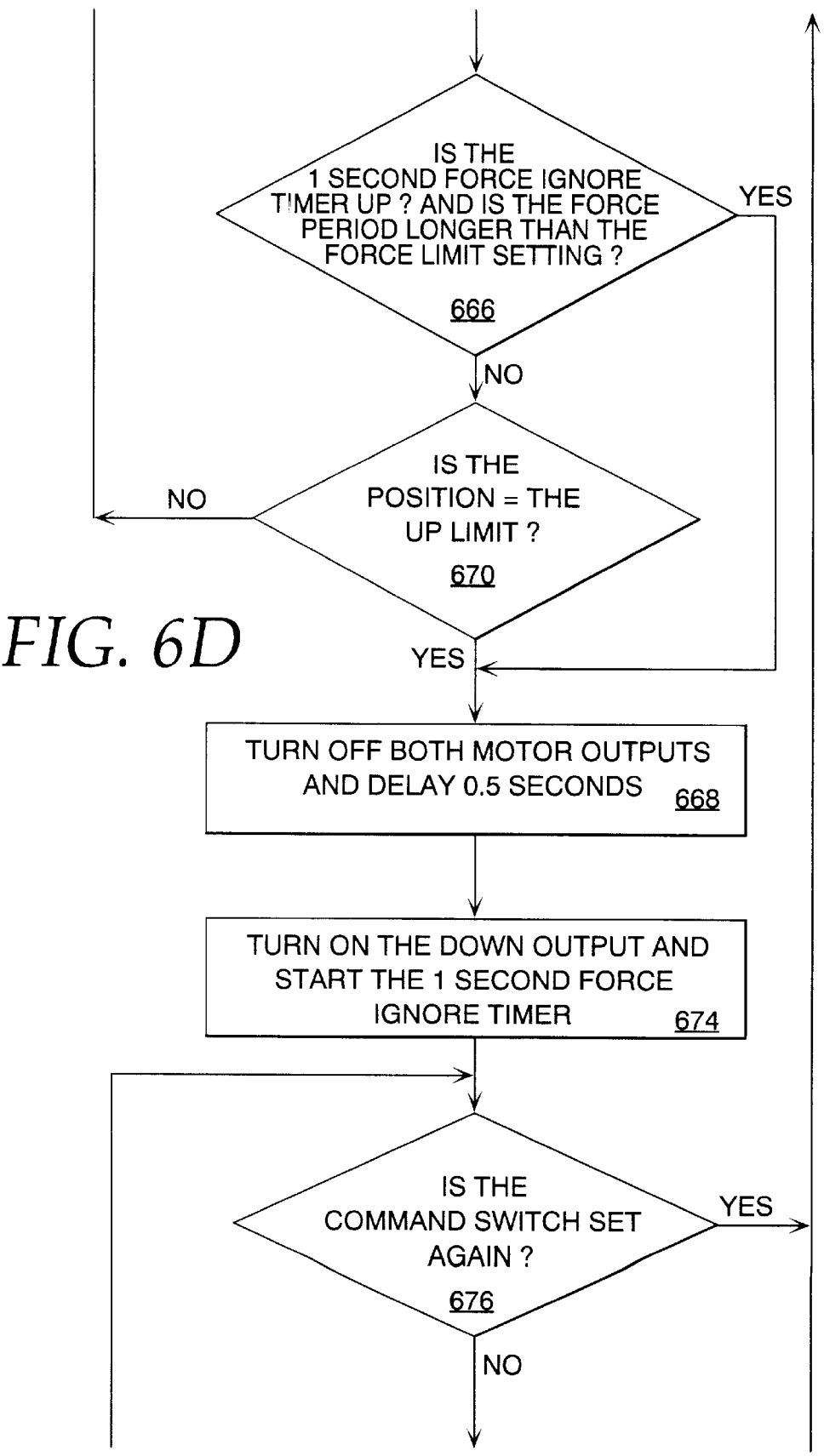
Figure 6E:
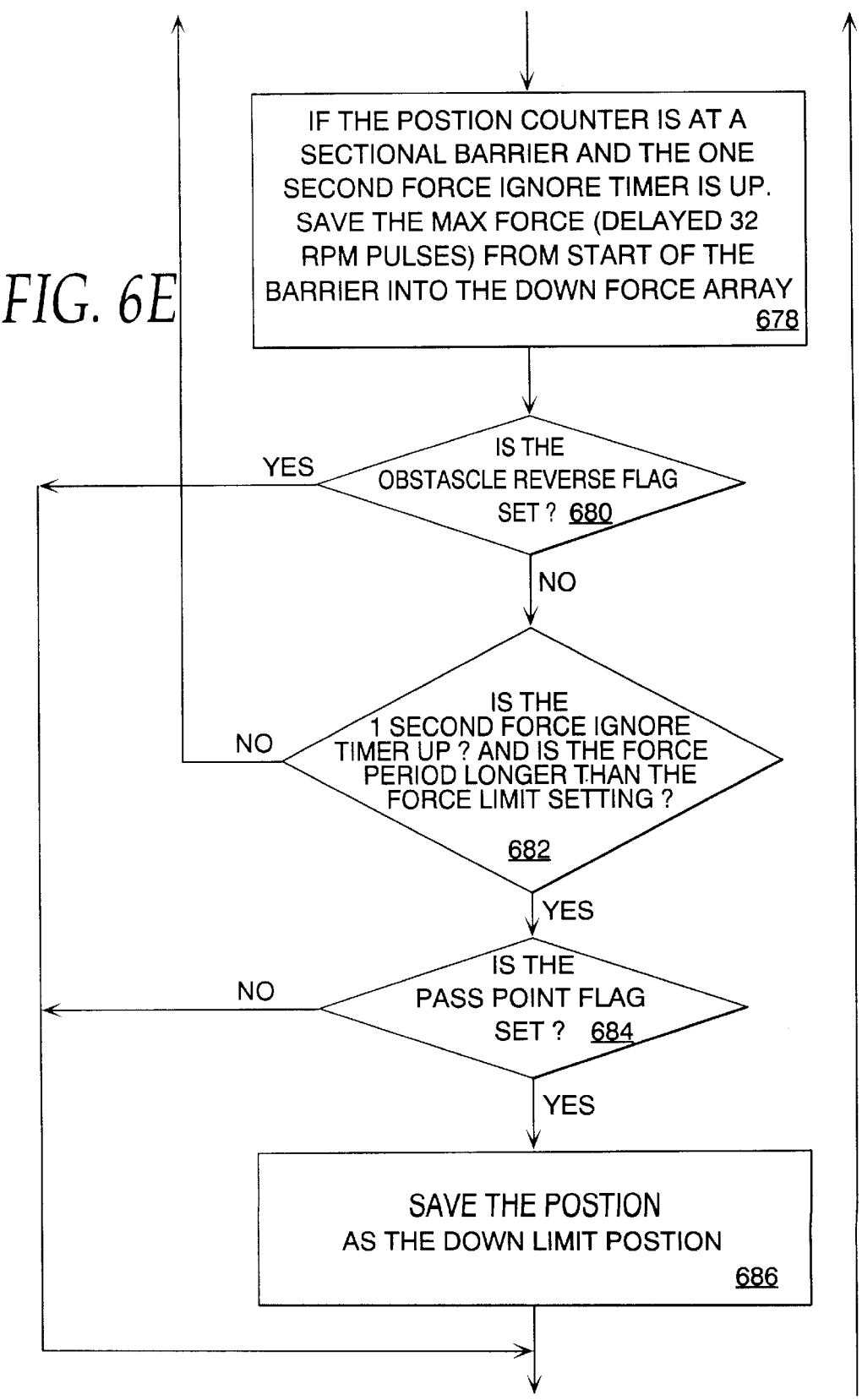
Figure 6F:
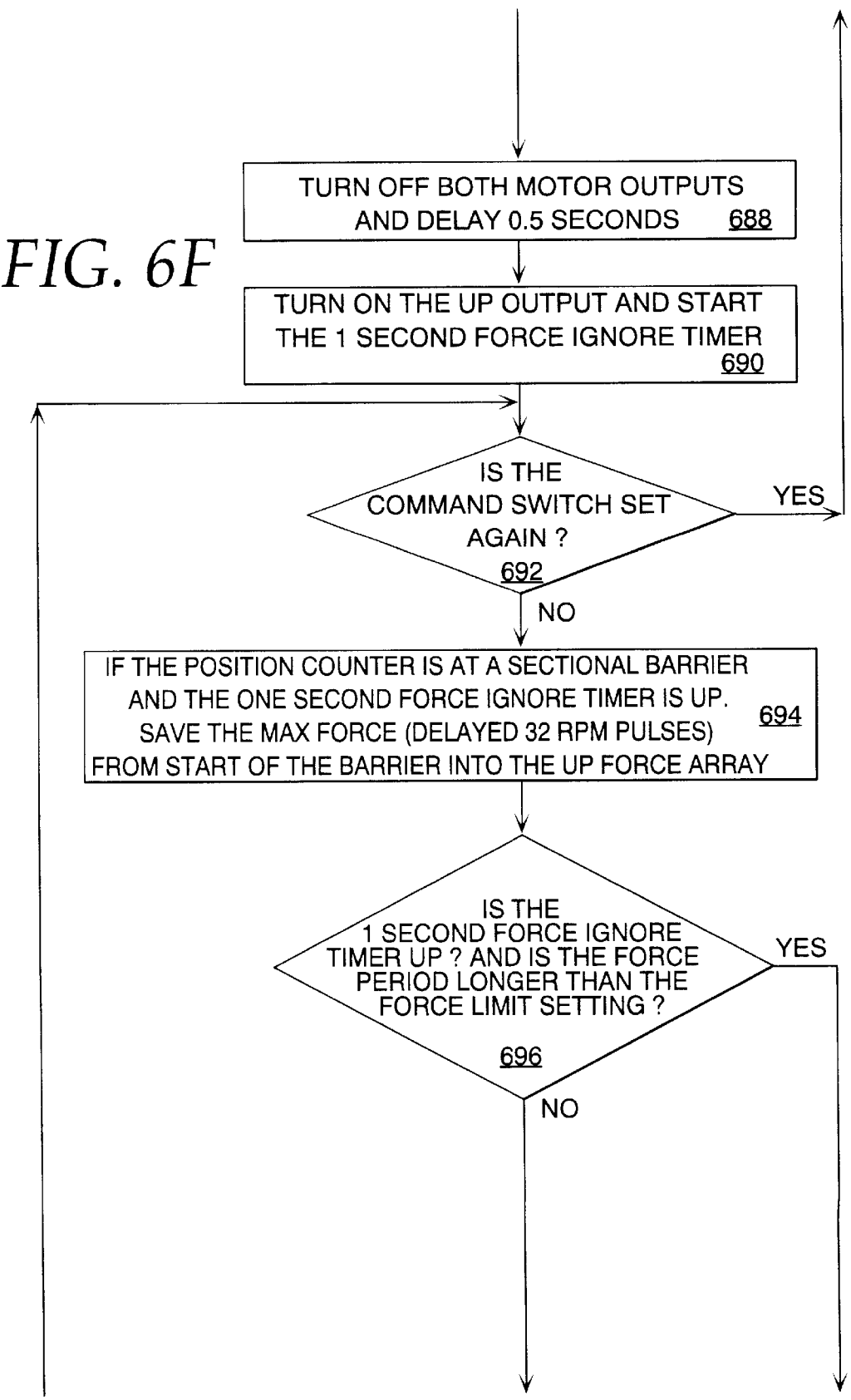
Figure 6G:
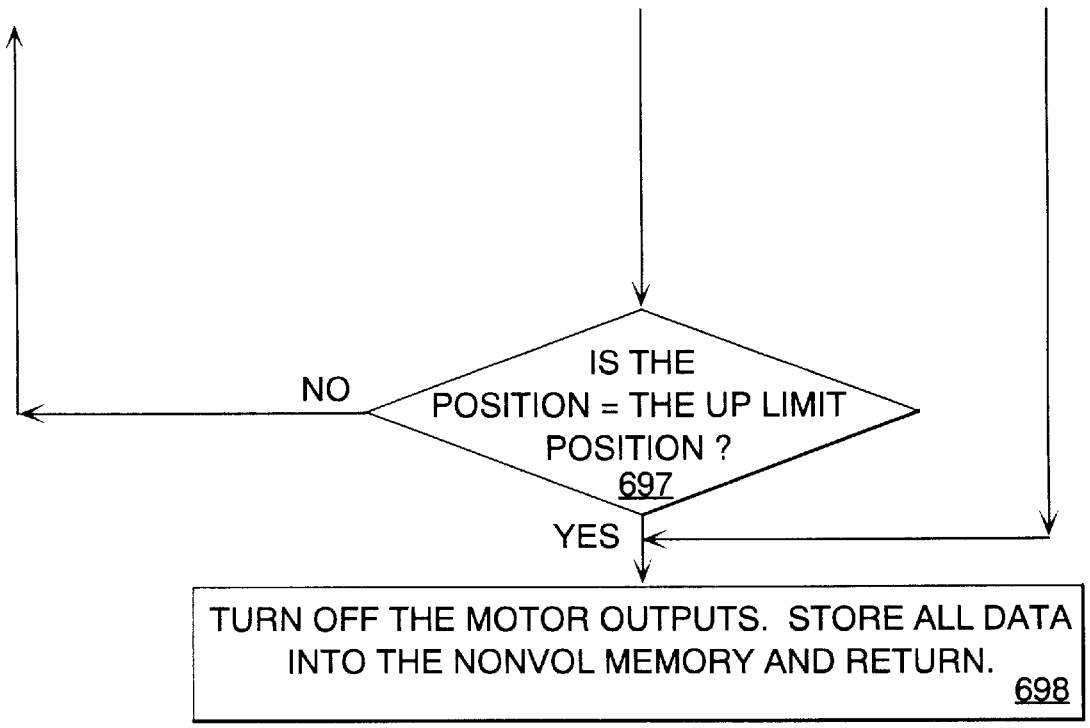
Figure 7A:
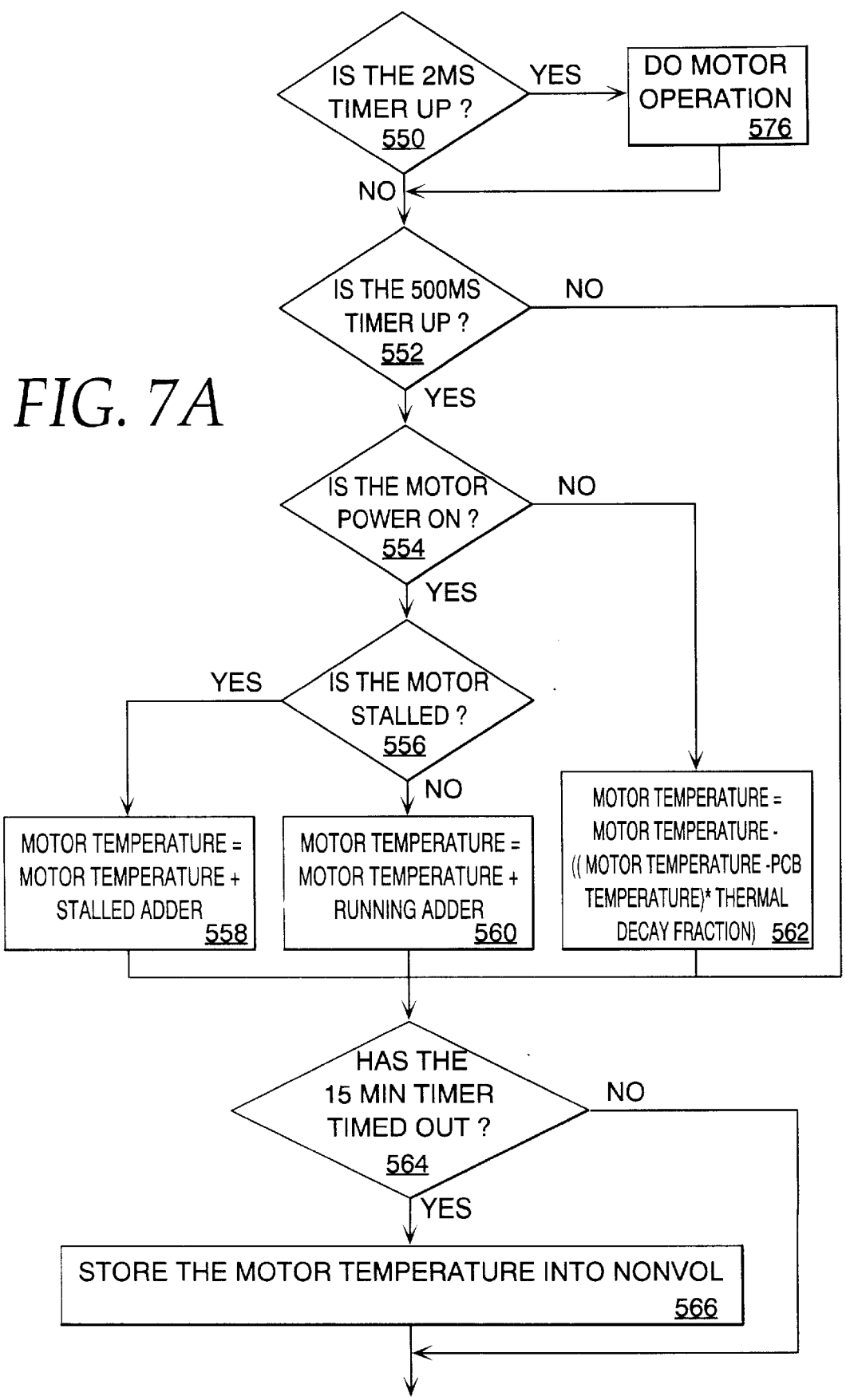

In the event that the learn switch has been activated as tested for in step 316 and the command switch is being held down as indicated by the positive result from the step 318, the learn limit cycle is entered in step 320 and transfers control to a step 630, as shown in FIG. 6A. In step 630, the maximum force is set to a minimum value from which it can later be incremented, if necessary. The motor up and motor down controllers in the relay logic 104 are disabled. The relay logic 104 includes an NPN transistor 700 coupled to line 76 to receive 24 to 28 volts therefrom ram via a coil 702 of a relay 704 having relay contacts 706. A transistor 710 coupled to the microcontroller is also coupled to line 76 via a relay coil 714 and together comprise an up relay 718 which is connected via a lead 720 to the electric motor 106. A down transistor 730 is coupled via a coil 732 to the power supply 76. The down relay 732 has an armature 734 associated with it and is connected to the motor to drive it down. Respective diodes 740 and 142 are connected across coils 714 and 732 to provide protection when the transistors 710 and 730 are switched off. In the step 632, both the transistors 710 and 730 are switched off, interrupting either up motor power or down motor power to the electric motor 106 and the microcontroller delays for 0.50 second. Control is then transferred to a step 634, causing the relay 704 to be switched on, delivering power to an electric light or worklight 750 associated with the head unit. The up motor relay 716 is switched on. A 1 second timer is also started which inhibits testing of force limits due to the inertia of the door as it begins moving. Control is then transferred to a step 636, testing for whether the 1 second timer has timed out and testing for whether the force period is longer than the force limit setting. If both conditions have occurred, control is transferred to a step 640 as shown in FIG. 6B. If either the 1 second timer has not timed out or the force period is not longer than the force limit setting, control is transferred to a step 638 which tests whether the command switch is still being held down. If it is, control is transferred back to step 636. If it is not, control is transferred to the step 640. In step 640, both the up transistor 710 and the down transistor 730 are causing both the up motor and down motor command from the relay logic to be interrupted and a delay of 0.50 second is taken and the position counter is cleared. Control is then transferred to a step 641 in which the transistor 730 is commanded to switch on, starting the motor moving down and the 1 second force ignore timer is started running. A test is made in a step 642 to determine whether the command switch has been activated again. If it has, the force limit setting is increased in a step 644 following which control is then transferred back to the step 632. If the command switch is not being held down, control is then transferred to a step 646, testing whether the 1 second force ignore timer has timed out. The last 32 rpm pulses indicative of the force are ignored and a force period from the previous pulse is accepted as the down force. Control is then transferred to a step 648 and a test is made to determine whether the movable barrier is at the pass point as indicated by the pass point detector 49 interacting with the optical detector 46. Control is then transferred to a step 650. The position counter is complemented and the complemented value is stored as the up limit following which the position counter is cleared and a pass point flag is set. Control is then transferred back to the step 642. In the event that the result of the test in step 648 is negative, control is transferred to a step 652 which tests whether the 1 second force delay timer has expired and whether the force period is greater than the force limit setting, indicating that the force has exceeded. If both of those conditions have occurred, control is transferred to a step 654 which tests whether the pass point flag has been set. If it has not been set, control is transferred to a step 656, wherein the position counter is complemented and the complemented value is saved as the up limit and the position counter is cleared. In the event that the pass point flag has been set, control is transferred to a step 658. In the event that the test in step 652 has been negative, control is transferred to a step 660 which tests the value of the obstacle reverse flag. If the obstacle reverse flag has not been set control is transferred to the step 642 shown on FIG. 6B. If the flag has been set, control is transferred to the step 654.

In a step 658, both transistors 710 and 730 are switched off interrupting up and down power from the relays to the electric motor 106 and halting the motor and the microcontroller 84 then delays for 0.50 second. Control is then transferred to a step 660. In step 660, the transistor 710 is switched on switching on the up relay causing the motor to be turned to drive the door upward and the 1 second force ignore timer is started. Control is transferred to a decision step 662 testing for whether the command switch is set. If the command switch is set, control is transferred back to the step 664 causing the force limit setting to be increased, following which control is transferred to the step 632, interrupting the motor outputs. If the command switch has not been set, control is transferred to the step 664 causing the maximum force from the 33rd previous reading to be saved as the up force, following which control is transferred to a decision block 666 which tests for whether the 1 second force ignore timer has expired and whether the force period is longer than the force limit setting. If both conditions are true, control is transferred to a step 668. If not, control is transferred to a step 670 which tests for whether the door position is at the up limit. If the door position is at the up limit, control is transferred to the step 668, switching off both of the motor outputs to halt the door and delaying for 0.50 second. If the position tested in step 670 is not at the upper limit, control is transferred back to the step 662. Following step 688 control is transferred to step 674, where the down output is turned on and the 1 second force ignore timer is started. Control is then transferred to the step 676 during which the command switch is tested. If the command switch is set, control is transferred back to the step 644 causing the force limit setting to be increased and ultimately to the step 632 which switches off the motor outputs and delays for 0.50 second. If the command switch has not been set, control is transferred to a step 678. If the position counter indicates that the door is presently at a point where a force transition normally occurs or where force settings are to change, and the 1 second force ignore timer has expired, the 33rd previous maximum force is stored and the down force array is filled with the last 33 force measurements. Control is then transferred to a step 680 which tests for whether the obstacle detector reverse flag has been set. If it has not been set, control is transferred to a step 682 which tests for whether the 1 second force ignore timer has expired and whether the force period is longer than the force limit setting. If both those conditions are true, control is transferred to a step 684 which tests for the pass point being set. If the pass point flag was not set, control is transferred to the step 686. In the event that the obstacle reverse flag is set, control is also transferred to the step 686 and then to 688. In the event that the decision block 682 is answered in the negative, control is transferred back to the step 676. If the pass point flag has been set as tested for in the step 684, control is transferred to the step 686 wherein the current door position is saved as the down limit position. In step 688, both the motor output transistors 710 and 730 are switched off, interrupting up and down power to the motor and a delay occurs for 0.50 second. Control is then transferred to the step 690 wherein the up transistor 710 is switched on, causing the up relay to be actuated, providing up power to the motor and the 1 second force ignore timer begins running. In the step 692, a test is made for whether the command has been set again. If it has, control is transferred back to the step 644, as shown in FIG. 6B, and following that to the step 632, as shown in FIG. 6A. If the command switch has not been set, control is transferred to the step 694 which tests for whether the position counter indicates that the door is at a sectional force transition point or barrier and the 1 second force ignore timer has expired. If both those conditions are true, the maximum force from the last sectional barrier is then loaded. Control is then transferred to a decision step 696 testing for whether the 1 second force ignore timer has timed out and whether the force period is indicated to be longer than the force period limit setting. If both of those conditions are true, control is then transferred to a step 698 causing the motor output transistors 710 and 730 to be switched off and all data is stored in the non-volatile memory So and the routine is exited. A the event that decision is indicated to be in the negative from the decision step 696, control is transferred to a step 697 which tests whether the door position is presently at the up limit position. If it is, control is then transferred to the step 698. If it is not, control is transferred to the step 692.

Figure 9A:
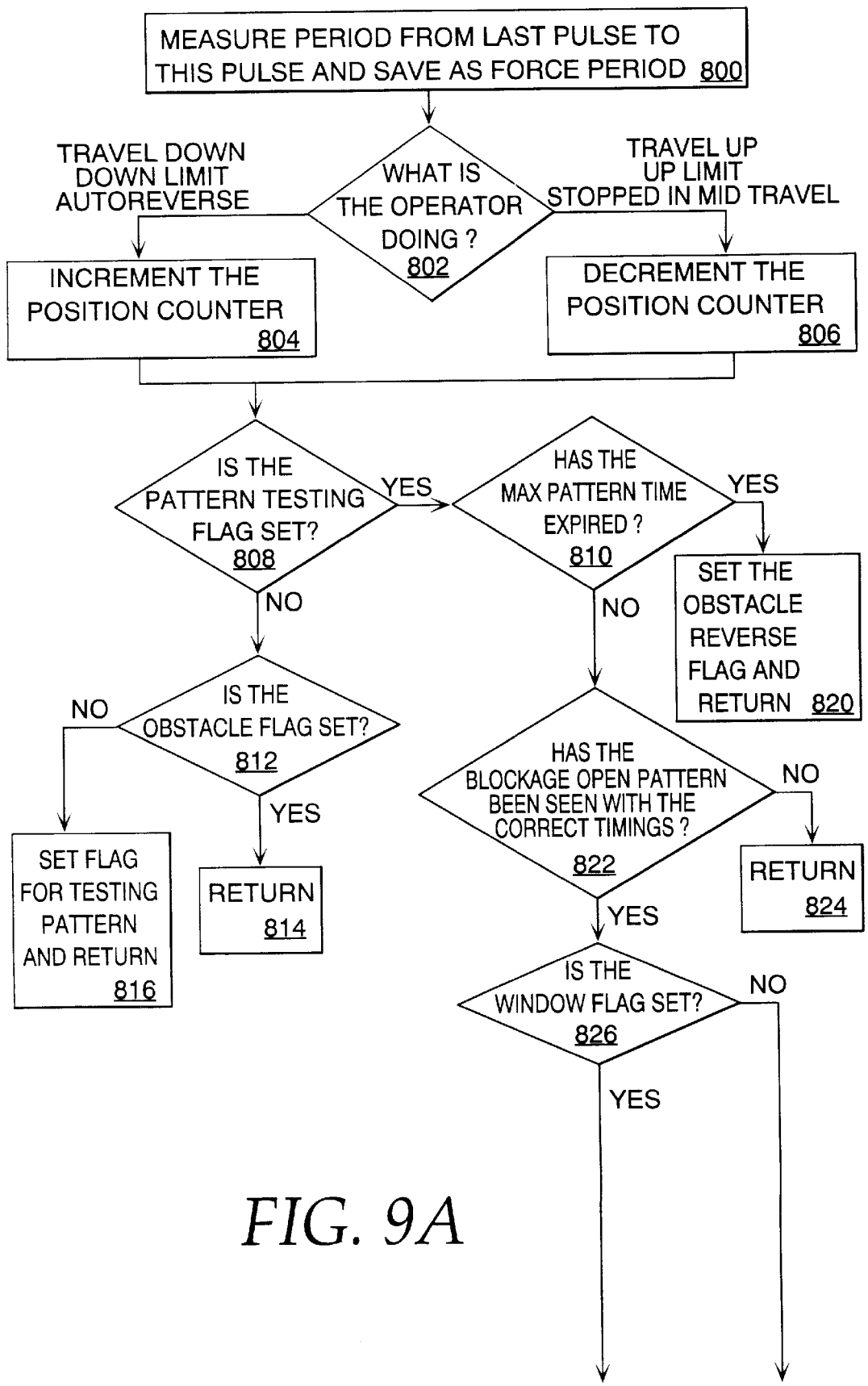
FIGS. 9A–B are a flow chart of a tachometer input routine and also determines the position of the door on the basis of the pass point system and input from the optical obstacle detector.
Figures 9A, 9B:
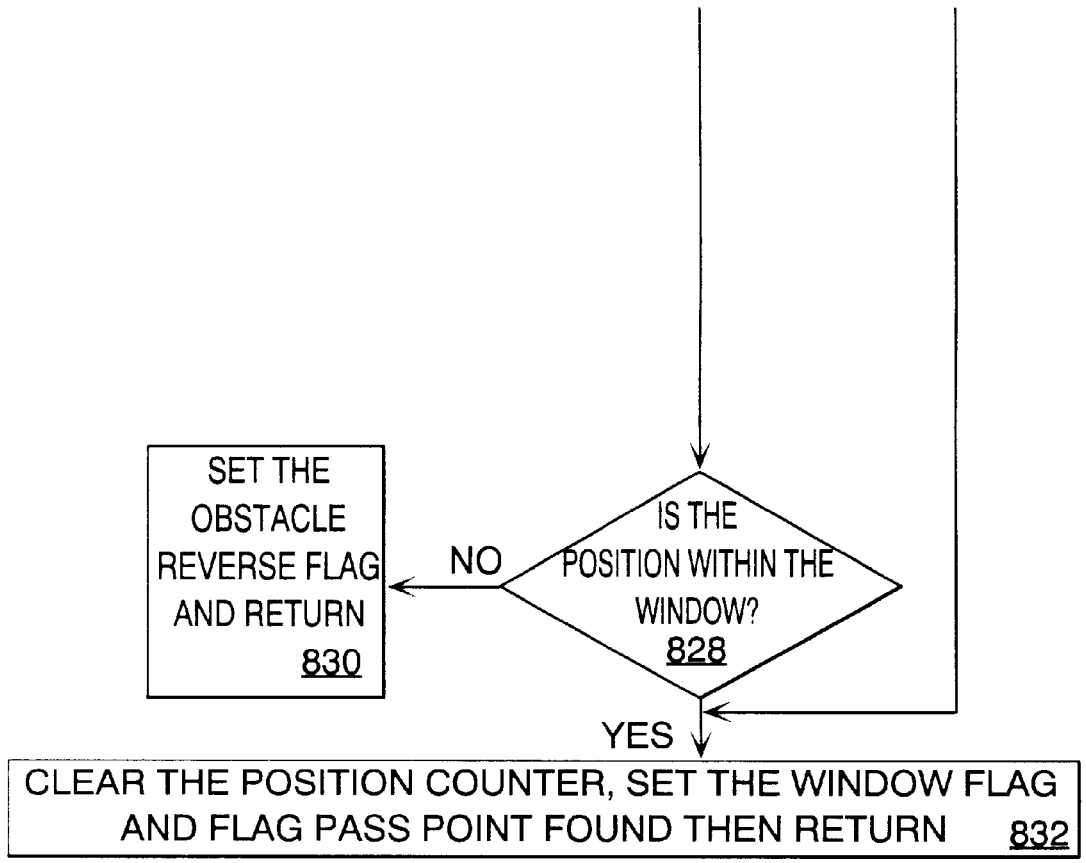

In the event that the rpm interrupt step 322, as shown in FIG. 5B, is executed, control is then transferred to a step 800, as shown in FIG. 9A. In step 800, the time duration from the last rpm pulse from the tachometer 110 is measured and saved as a force period indication. Control is then transferred to a decision block. Control is transferred to the step 802, in which the operator state variable is tested. In the event that the operator state variable indicates that the operator is causing the door to travel down, the door is at the down limit or the door is in the auto reverse mode, control is transferred to a step 804 causing, the door position counter to be incremented. In the event that the door operator state indicates that the door is travelling upward, has reached its up limit or has stopped in mid-travel, control is transferred to a step 806 which causes the position counter to be decremented. Control is then transferred to a decision step 808 in which the pass point pattern testing flag is tested for whether it is set. If it is set, control is transferred to a step 810 which tests a timer to determine whether the maximum pattern time allotted by the system has expired. In the event that the pass point pattern testing flag is not set, control is transferred to a step 812, testing for whether the optical obstacle detector flag has been set. If it is not set, the routine is exited in a step 814. If the obstacle detector flag has been set, control is transferred to a step 816 wherein the pattern testing flag is set and the routine is exited. In the event that the maximum pattern time has times out, as tested for in the step 810, control is transferred to a step 820 wherein the optical reverse flag is set and the routine is exited. In the maximum pattern time has not expired, a test is made in a step 822 for whether the microcontroller has sensed from the obstacle detector that the beam has been blocked open within a correct timing sequence indicative of the pass point detection system. If it has not, the routine is exited in a step 824. If it has, control is transferred to a step 826. Testing for whether a window flag has been set. As to whether the rough position of the door would indicate that the pass point should have been encountered. If the window flag has been set, control is transferred to a step 828, testing for whether the position is within the window flag position. If it has, control is transferred to a step 832, causing the position counter to be cleared or renormalized or zeroed, setting the window flag and set a flag indicating that the pass point has been found, following which the routine is exited. In the event that the position is not within the window as tested for in step 826, the obstacle reverse flag is set in a step 830 and the routine is exited. In the event that the test made in step 326 indicates that the window flag has not been set, control is then transferred directly to the step 832.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method of setting the motion limits of a garage door operator which includes a garage door within a frame comprising:

initiating a learn mode of said operator;

driving the garage door up to a desired up limit storing a preselected value in a position counter of said operator;

driving the garage door down to a position fixed with respect to the frame;

changing the position counter value in response to the garage door downward movement;

storing a normalizing value in the position counter;

driving the garage door down to a fully closed position;

changing the position counter value in response to the garage door movement from a position corresponding to the normalizing value;

storing the position counter value as a down limit value;

optically generating a pass point signal for normalizing the position of the barrier; and changing the position counter in response to the pass point signal to effect normalization of the barrier position indication.

2. A method of setting limits of travel for a movable barrier operator comprising:

initiating a learn mode of said operator;

driving the movable barrier up to a desired up limit;

storing an upper limit value;

driving the movable barrier down to a position fixed with respect to a frame;

electromagnetically generating an independent position signal from a sensor fixed with respect to the frame, the independent position signal being representative of an electromagnetically detected barrier position, the independent position signal being effective for normalizing the position of the barrier;

changing the counter in response to the independent, position signal to effect normalization of a barrier position;

driving the movable barrier down from a position which corresponds to the position of the sensor at a fully down position; and storing a downward displacement value corresponding to the fully down position.

\* \* \* \* \*